United States Patent
Chen

(10) Patent No.: US 10,871,886 B2
(45) Date of Patent: Dec. 22, 2020

(54) DEVICE, METHOD, AND GRAPHICAL USER INTERFACE FOR MOVING DRAWING OBJECTS

(71) Applicant: Apple Inc., Cupertino, CA (US)

(72) Inventor: Jennifer P. Chen, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/378,735

(22) Filed: Apr. 9, 2019

(65) Prior Publication Data

US 2019/0369846 A1 Dec. 5, 2019

Related U.S. Application Data

(60) Provisional application No. 62/678,754, filed on May 31, 2018.

(51) Int. Cl.
*G06F 3/0484* (2013.01)
*G06F 3/0486* (2013.01)
*G06F 3/0488* (2013.01)

(52) U.S. Cl.
CPC ........ *G06F 3/04845* (2013.01); *G06F 3/0486* (2013.01); *G06F 3/04842* (2013.01); *G06F 3/04883* (2013.01)

(58) Field of Classification Search
CPC ............. G06F 3/04845; G06F 3/04883; G06F 3/04842; G06F 3/0486; G06F 3/04886; G06F 3/0484
See application file for complete search history.

(56) References Cited

U.S. PATENT DOCUMENTS

| | | | | |
|---|---|---|---|---|
| 2011/0185300 A1* | 7/2011 | Hinckley | ............ | G06F 3/03545 715/769 |
| 2014/0208277 A1* | 7/2014 | Makino | ................. | G06F 3/0488 715/863 |
| 2014/0267078 A1* | 9/2014 | Kukulski | .............. | G06F 3/0442 345/173 |
| 2014/0351725 A1* | 11/2014 | Kim | ...................... | G06F 3/0486 715/765 |
| 2015/0089414 A1* | 3/2015 | Park | .................... | G06F 3/04847 715/765 |
| 2017/0038924 A1* | 2/2017 | Okuma | .................. | G09G 5/377 |

* cited by examiner

*Primary Examiner* — Brent D Castiaux
(74) *Attorney, Agent, or Firm* — Fernando & Partners, LLP

(57) ABSTRACT

In accordance with various implementations, a method is performed at an electronic device with a display device and one or more input devices. The method includes displaying, on the display device, a drawing user interface that includes a set of drawing objects. The method includes detecting, via the one or more input devices, a first user input moving to define a path within the drawing user interface. In response to detecting the first user input moving to define the path within the drawing user interface, the method includes displaying, on the display device, a representation of the path within the drawing user interface. The method includes detecting, via the one or more input devices, a second user input moving within the drawing user interface from a first location on a first side of the representation of the path to a second location. In response to detecting the second user input and in accordance with a determination that the path satisfies a length criterion, the method includes moving those of the set of drawing objects on the first side of the representation of the path.

19 Claims, 34 Drawing Sheets

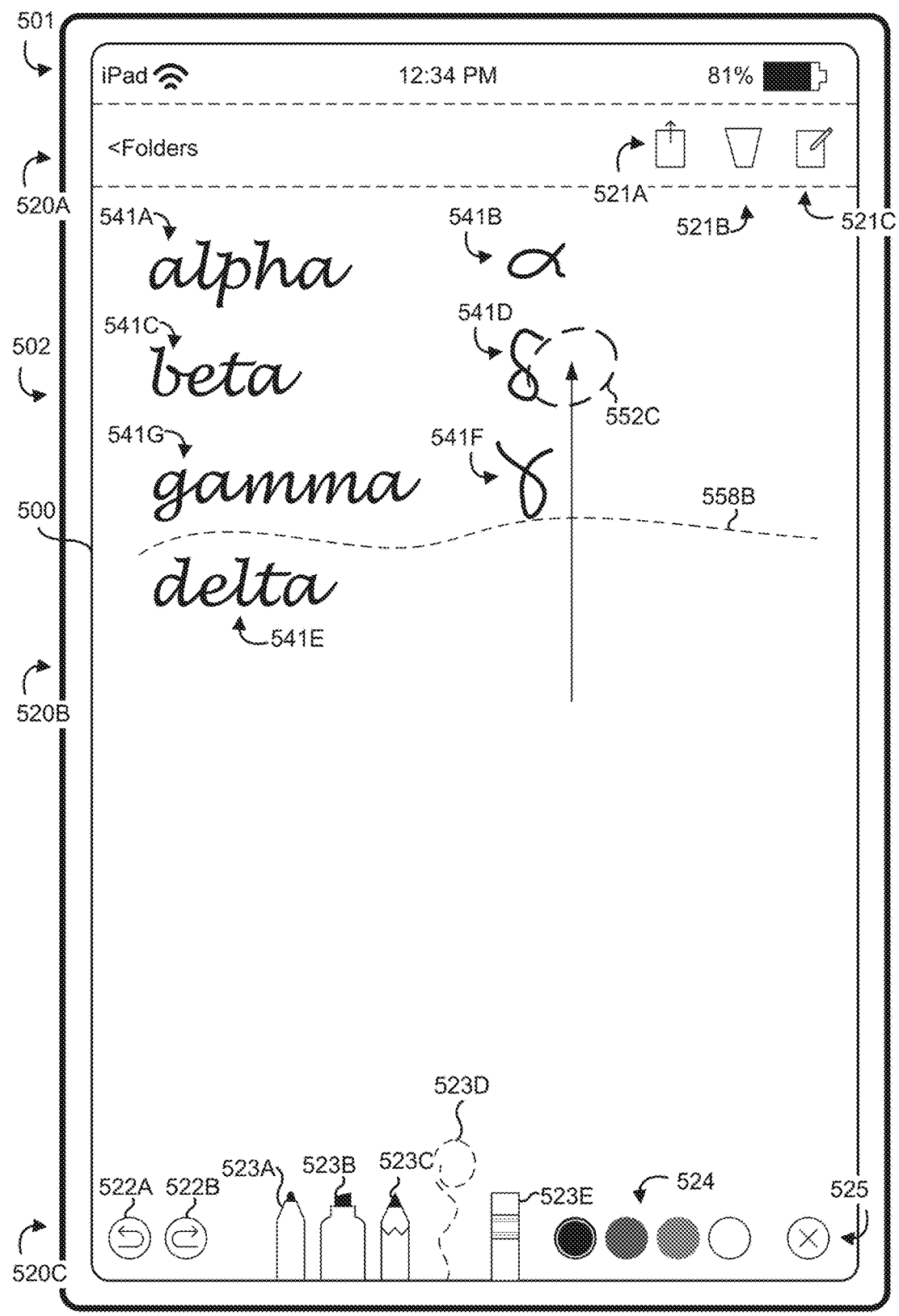
Figure 5O1

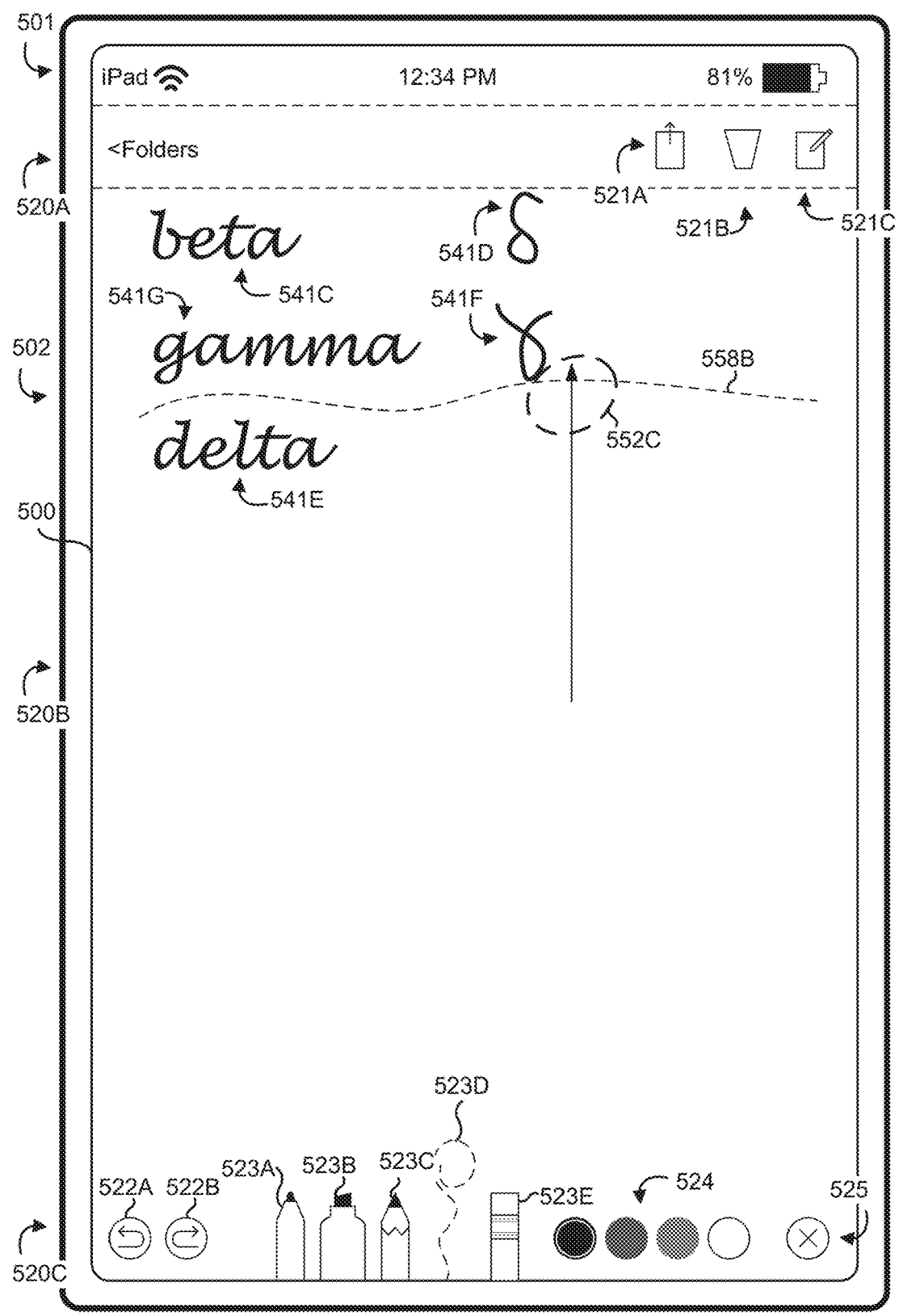
Figure 5O2

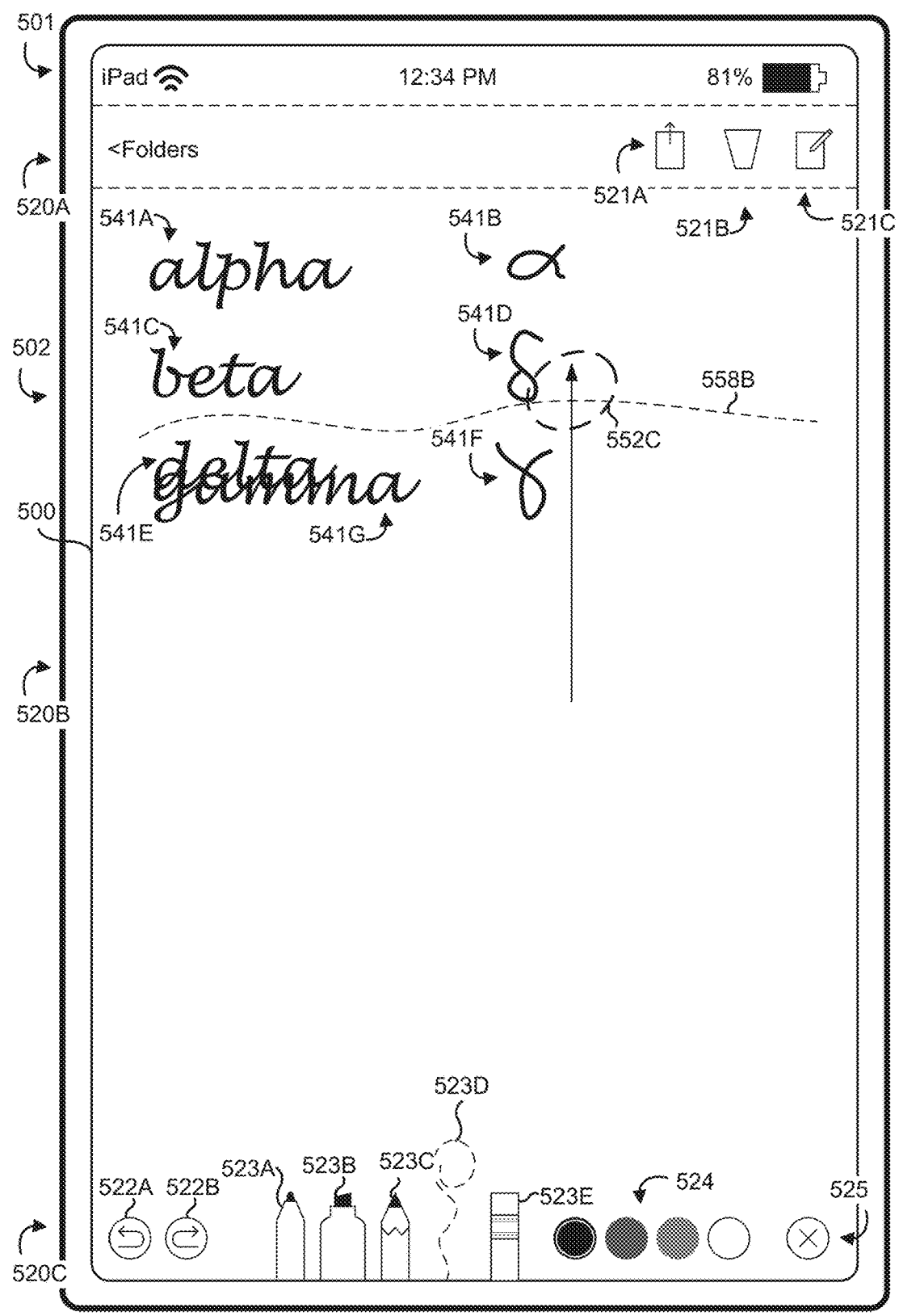
Figure 5O3

600

```
┌─────────────────────────────────────────────────────────────────┐
│      In response to detecting the second user input and in accordance with
│  a determination that the path satisfies a length criterion, moving those of the
│  set of drawing objects on the first side of the representation of the path
│                                                                          ⎯620
│                              Ⓐ
│
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  │    Moving those of the set of drawing objects on the first side of the    ⎯622
│  │ representation of the path in accordance with a determination that the
│  │ second user input includes a finger user input
│  │  ┌ ─ ─ ─ ─ ─ ─ ─ ─ ─ ─ ─ ─ ─ ─ ─ ─ ─ ─ ─ ─ ─ ─ ─ ─ ─ ┐
│  │  │    In accordance with a determination that the second user   ⎯624
│  │  │ input includes a stylus user input, displaying a representation of a
│  │  │ movement of the second user input
│  │  └ ─ ─ ─ ─ ─ ─ ─ ─ ─ ─ ─ ─ ─ ─ ─ ─ ─ ─ ─ ─ ─ ─ ─ ─ ─ ┘
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
│
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  │    In response to detecting the second user input and in accordance
│  │ with a determination that the path does not satisfy the length criterion   ⎯626
│  │ and does satisfy an object-enclosure criterion, moving those of the set of
│  │ drawing objects enclosed by the path
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
│
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  │    In accordance with a determination that the path does not satisfy
│  │ the length criterion and does not satisfy an object-enclosure criterion,   ⎯628
│  │ ceasing display of the representation of the path
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
│
│                              Ⓑ
└─────────────────────────────────────────────────────────────────┘
```

In response to detecting the second user input and in accordance with a determination that the path satisfies a length criterion, moving those of the set of drawing objects on the first side of the representation of the path ⎯620

Ⓑ

The set of drawing objects includes a first drawing object on the first side of the representation of the path and a second drawing object on a second side of the representation of the path ⎯630

Increasing the distance between the first drawing object and the second drawing object ⎯632

Increasing the distance between the first drawing object and the second drawing object by an amount proportional to a distance of movement of the second user input ⎯634

Increasing the distance between the first drawing object and the second drawing object creates a blank region of the drawing user interface ⎯636

Detecting, via the one or more input devices, a drawing user input within the blank region ⎯638

In response to detecting the drawing user input, displaying, on the display device, a third drawing object in the blank region corresponding to the drawing user input ⎯640

Detecting, via the one or more input devices, a scrolling user input within the drawing user interface ⎯642

In response to detecting the scrolling user input, moving the first drawing object, the second drawing object, and the third drawing object ⎯644

In response to detecting the second user input and in accordance with a determination that the path satisfies a length criterion, moving those of the set of drawing objects on the first side of the representation of the path 620 — The set of drawing objects includes a first drawing object on the first side of the representation of the path and a second drawing object on a second side of the representation of the path 630 — Increasing the distance between the first drawing object and the second drawing object

632 — (C)

646 — Detecting, via the one or more input devices, a third user input moving to define a second path within the drawing user interface between the first drawing object and the second drawing object 648 — In response to detecting the third user input, displaying, on the display device, a representation of the second path within the drawing user interface 650 — Detecting, via the one or more input devices, a fourth user input moving within the drawing user interface from a first location on the first side of the representation of the second path to a second location 652 — In response to detecting the fourth user input, decreasing the distance between the third drawing first drawing object and at least one of the first drawing object and the second drawing object (D)

```
┌─────────────────────────────────────────────────────────────┐
│     In response to detecting the second user input and in accordance with
│ a determination that the path satisfies a length criterion, moving those of the
│ set of drawing objects on the first side of the representation of the path
│  ┌───────────────────────────────────────────────────────┐ ─620
│  │    The set of drawing objects includes a first drawing object on the
│  │ first side of the representation of the path and a second drawing object
│  │ on a second side of the representation of the path                        ─630
│  │
│  │                        (D)
│  │  ┌─────────────────────────────────────────────────┐
│  │  │   Decreasing the distance between the first drawing object and  ─654
│  │  │ the second drawing object
│  │  │  ┌──────────────────────────────────────────┐
│  │  │  │    In response to a first portion of the second user input,
│  │  │  │ decreasing the distance between the first drawing object and
│  │  │  │ the second drawing object by an amount proportional to a       ─656
│  │  │  │ distance of a first portion of the second user input until the
│  │  │  │ representation of the path touches one of the set of objects on
│  │  │  │ the second side of the representation of the path
│  │  │  └──────────────────────────────────────────┘
│  │  │  ┌──────────────────────────────────────────┐
│  │  │  │    In response to a second portion of the second user          ─658
│  │  │  │ input, maintaining the locations of the first drawing object and
│  │  │  │ the second drawing object
│  │  │  └──────────────────────────────────────────┘
│  │  │  ┌──────────────────────────────────────────┐
│  │  │  │    In response to a second portion of the second user
│  │  │  │ input, moving the first drawing object and the second drawing  ─660
│  │  │  │ object by an amount proportional to a distance of the second
│  │  │  │ portion of the second user input
│  │  │  └──────────────────────────────────────────┘
│  │  │  ┌──────────────────────────────────────────┐
│  │  │  │    In response to a second portion of the user input,
│  │  │  │ moving the first drawing object by an amount proportional to a ─662
│  │  │  │ distance of the second portion of the second user input and
│  │  │  │ maintaining the location of the second drawing object
│  │  │  └──────────────────────────────────────────┘
│  │  └─────────────────────────────────────────────────┘
│  │  ┌─────────────────────────────────────────────────┐
│  │  │    Moving those of the set of drawing object on the first side of the  ─664
│  │  │ representation of the path along a predetermined axis
│  │  └─────────────────────────────────────────────────┘
└─────────────────────────────────────────────────────────────┘
```

Figure 6E

DEVICE, METHOD, AND GRAPHICAL USER INTERFACE FOR MOVING DRAWING OBJECTS

CROSS-REFERENCE TO RELATED APPLICATIONS

This application claims priority to U.S. Provisional Patent App. No. 62/678,754, filed on May 31, 2018, which is hereby incorporated by reference in its entirety.

TECHNICAL FIELD

The present disclosure relates generally to electronic devices with touch-sensitive surfaces, including but not limited to electronic devices with touch-sensitive surfaces that allow a user to move drawing objects within a drawing user interface.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display. Such manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

Some user interfaces display a drawing user interface that allows a user to insert, via user input, drawing objects within the drawing user interface. Further, some user interfaces provide methods for moving drawings objects within the drawing user interface with respect to one another, thereby adding or removing whitespace within the drawing user interface. However, methods for moving drawing objects are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for moving drawing objects. Such methods and interfaces optionally complement or replace conventional methods for moving drawing objects. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display device and one or more input devices. The method includes displaying, on the display device, a drawing user interface that includes a set of drawing objects. The method includes detecting, via the one or more input devices, a first user input moving to define a path within the drawing user interface. In response to detecting the first user input moving to define the path within the drawing user interface, the method includes displaying, on the display device, a representation of the path within the drawing user interface. The method includes detecting, via the one or more input devices, a second user input moving within the drawing user interface from a first location on a first side of the representation of the path to a second location. In response to detecting the second user input and in accordance with a determination that the path satisfies a length criterion, the method includes moving those of the set of drawing objects on the first side of the representation of the path.

In accordance with some embodiments, an electronic device includes a display device, one or more input devices, and one or more processors. The one or more processors are configured to display, on the display device, a drawing user interface that includes a set of drawing objects. The one or more processors are configured to detect, via the one or more input devices, a first user input moving to define a path within the drawing user interface. In response to detecting the first user input moving to define the path within the drawing user interface, the one or more processors are configured to display, on the display device, a representation of the path within the drawing user interface. The one or more processors are configured to detect, via the one or more input devices, a second user input moving within the drawing user interface from a first location on a first side of the representation of the path to a second location. In response to detecting the second user input and in accordance with a determination that the path satisfies a length criterion, the one or more processors are configured to move those of the set of drawing objects on the first side of the representation of the path.

In accordance with some embodiments, an electronic device includes a display device, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer-readable storage medium has stored therein instructions which when executed by one or more processors of an electronic device with a display device and one or more input devices, cause the electronic device to perform or cause performance of the operations of any of the methods described herein. In accordance with some embodiments, a graphical user interface on an electronic device with a display device, one or more input devices, a non-transitory memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display device, one or more input devices; and means for performing or causing performance of the operations of any of the methods described herein. In accordance with some embodiments, an information processing apparatus, for use in an electronic device with a display device and one or more input devices, includes means for performing or causing performance of the operations of any of the methods described herein.

Thus, electronic devices with display devices and one or more input devices are provided with faster, more efficient methods and interfaces for moving drawing objects, thereby increasing the effectiveness, efficiency, and user satisfaction with such electronic devices. Such methods and interfaces may complement or replace conventional methods for moving drawing objects.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6E are flow diagrams illustrating a method of moving drawing objects in accordance with some embodiments.

DESCRIPTION OF EMBODIMENTS

Figure 1A:
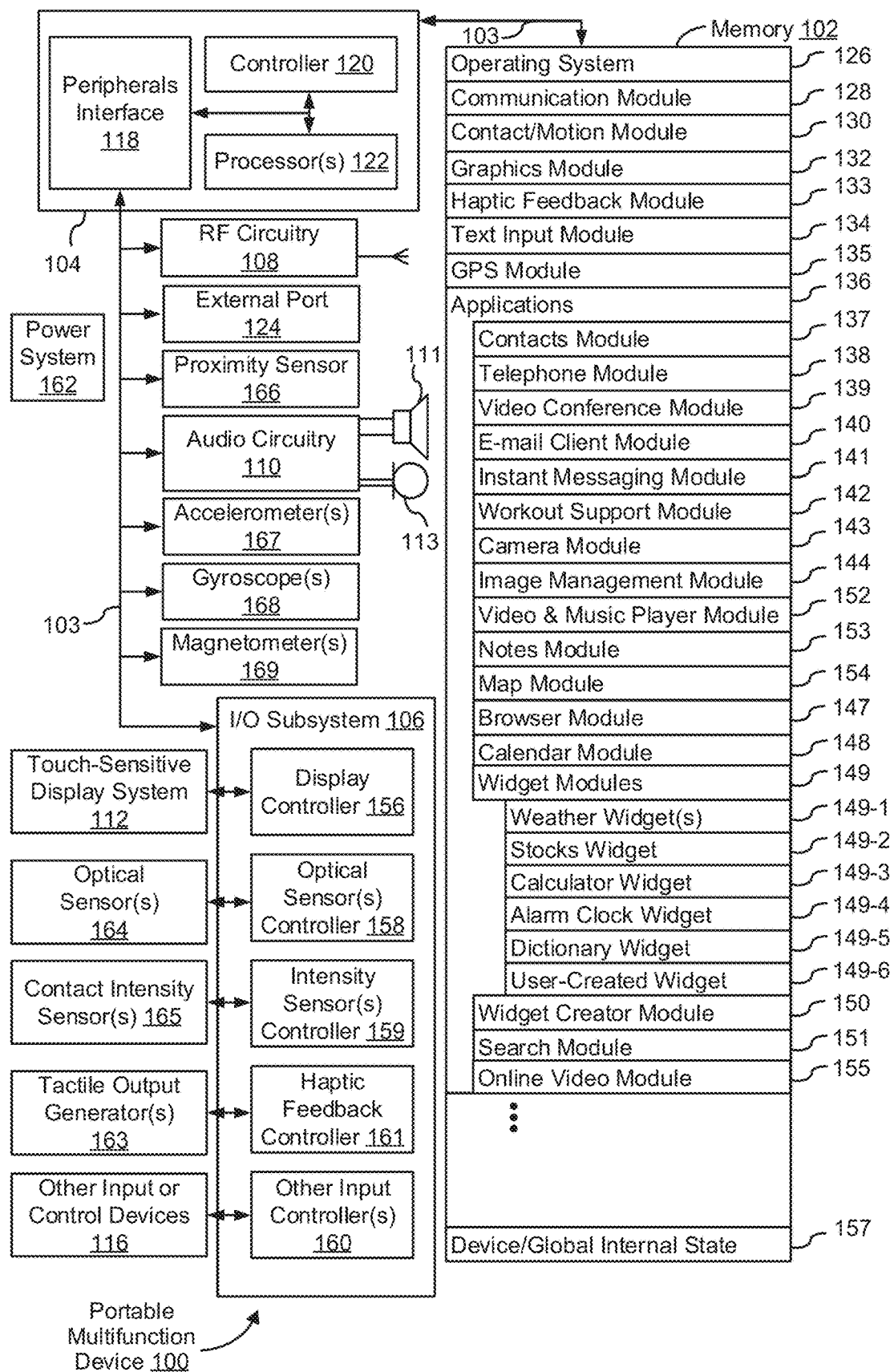
FIG. 1A is a block diagram illustrating a portable multifunction device with a touch-sensitive display in accordance with some embodiments.

Many electronic devices have graphical user interfaces that allow a user to insert hand-drawn drawing objects, such as an image or hand-written text, into a content region. Inserting whitespace in the content region between drawing objects, e.g., to insert addition drawing objects therein, can be cumbersome. In embodiments described below, an application allows a user to efficiently move drawing object to create (or reduce) whitespace between drawing objects. For example, in some embodiments, in response to detecting a user input indicative of a path across the content region, a representation of the path is displayed and with a single user input, all drawing objects below the representation of the path are moved, thereby creating whitespace.

Below, a description of example devices illustrates in FIGS. 1A-1B, 2, and 3 is provided. FIGS. 4A-4B and 5A-5U illustrate example user interfaces for moving drawing objects. FIGS. 6A-6E illustrate a flow diagram of a method of moving drawing objects. The user interfaces in FIGS. 5A-5U are used to illustrate the processes in FIGS. 6A-6E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 120, one or more processing units (CPUs) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or an "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 122 and the peripherals interface 118, is, optionally, controlled by memory controller 120.

Peripherals interface 118 can be used to couple input and output peripherals of the device to CPU(s) 122 and memory 102. The one or more processors 122 run or execute various software programs and/or sets of instructions stored in memory 102 to perform various functions for device 100 and to process data.

In some embodiments, peripherals interface 118, CPU(s) 122, and memory controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

Figure 3:
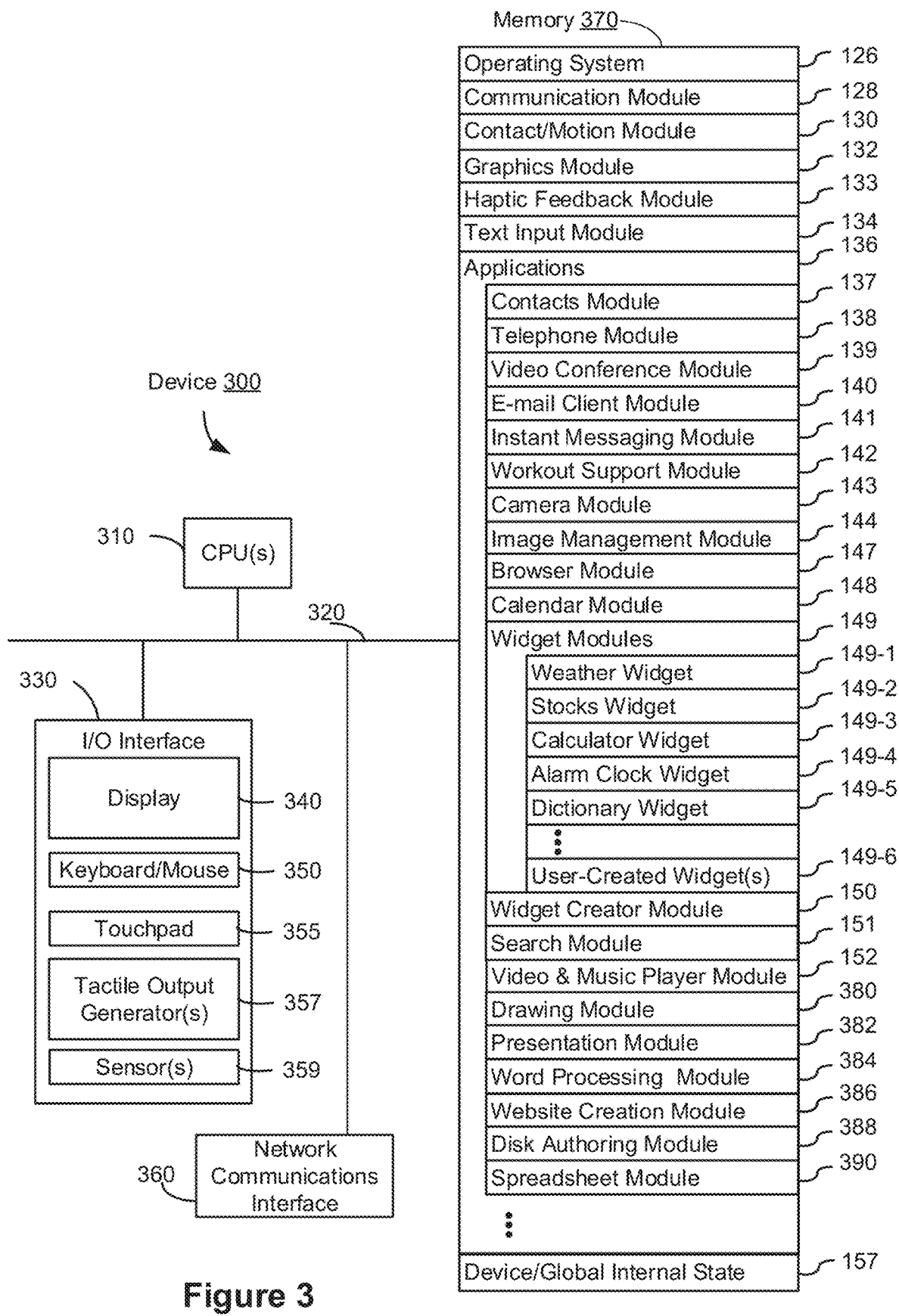
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conference module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail client 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, video conference module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
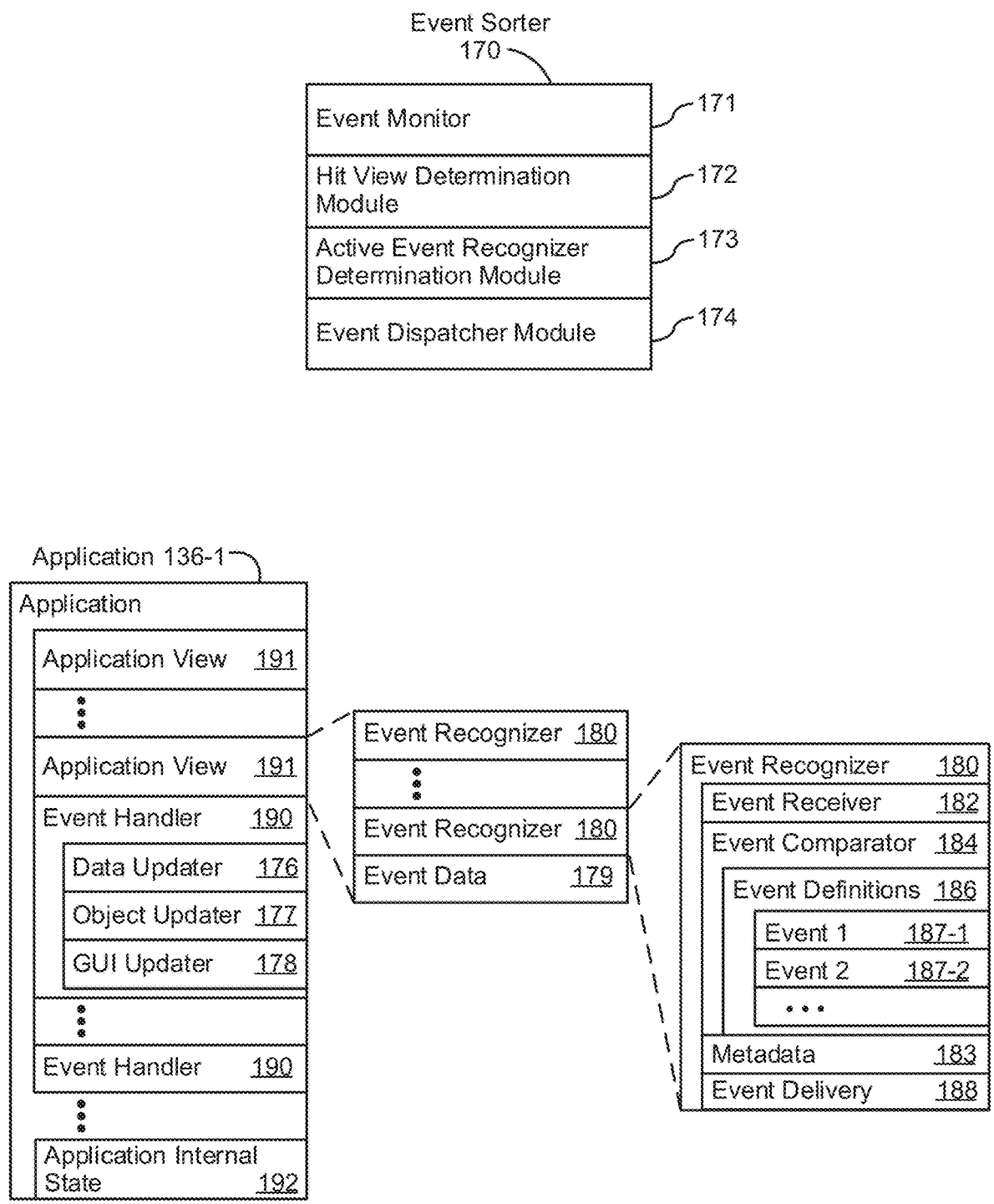
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in a respective event, such as event 1 (187-1) or event 2 (187-2), include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, the event definition for a respective event, such as event 1 (187-1) or event 2 (187-2), includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event, such as event 1 (187-1) or event 2 (187-2), also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
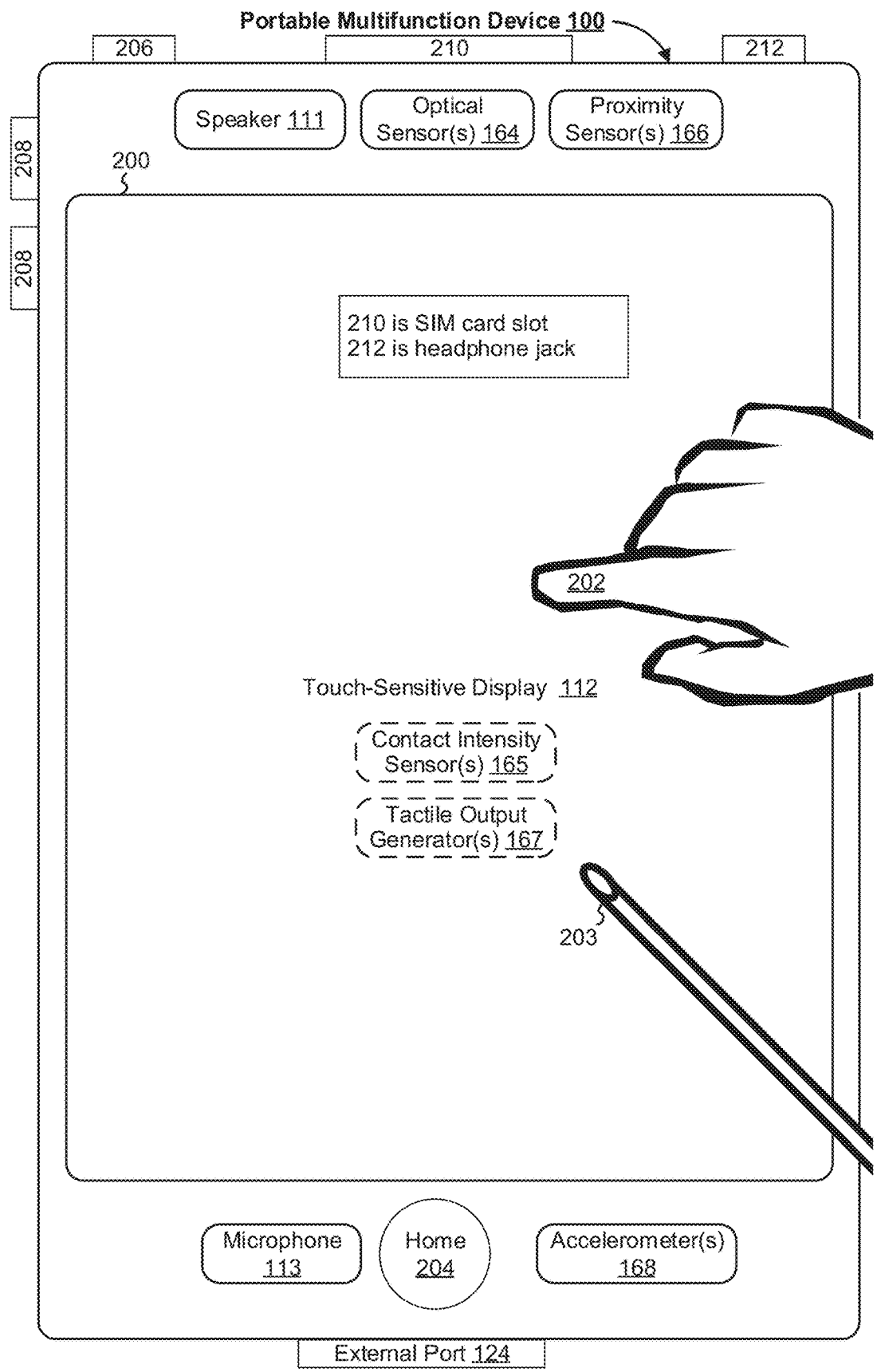
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
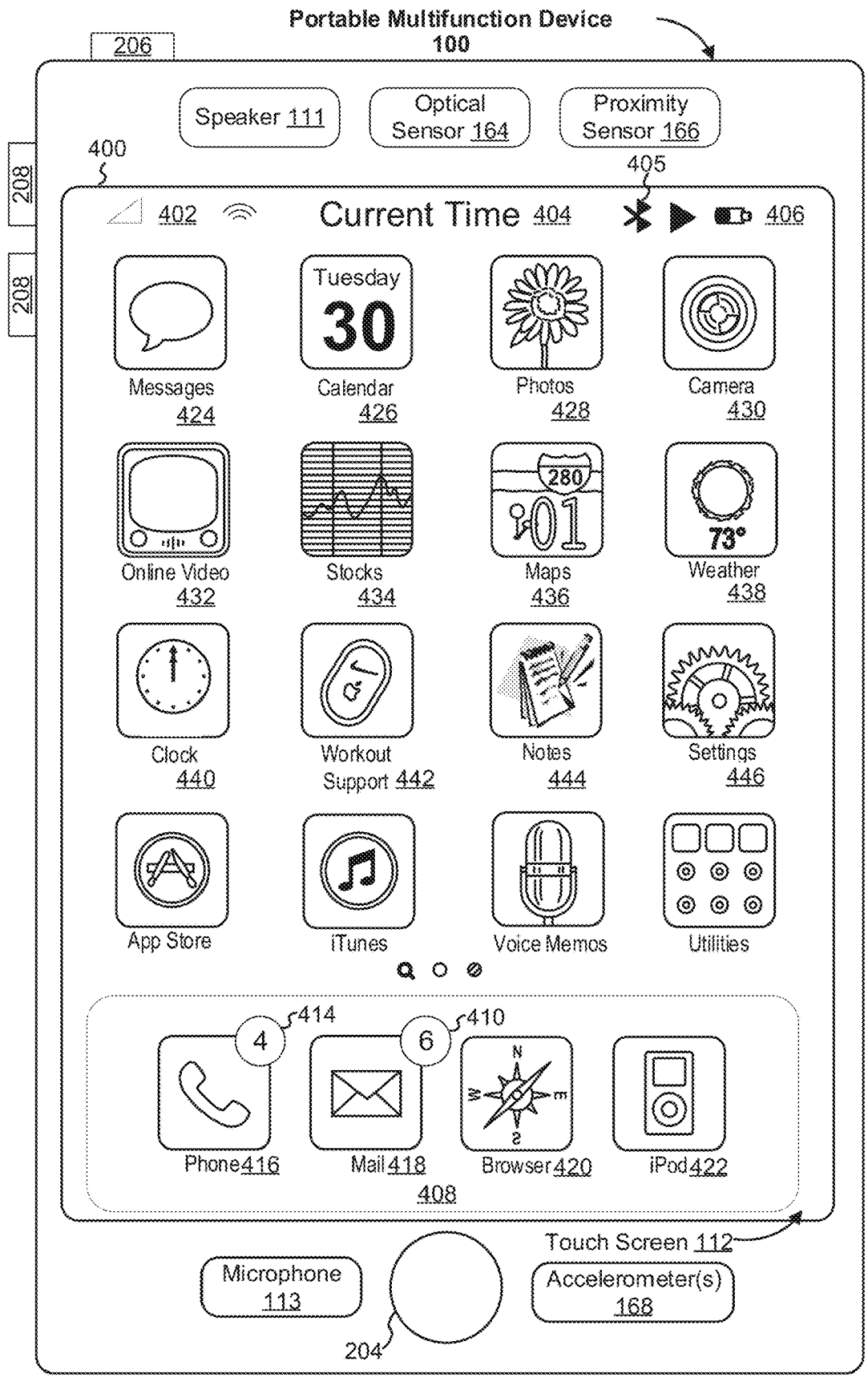
FIG. 4A illustrates an example user interface for a menu of applications on a portable multifunction device in accordance with some embodiments.
Figure 5A:
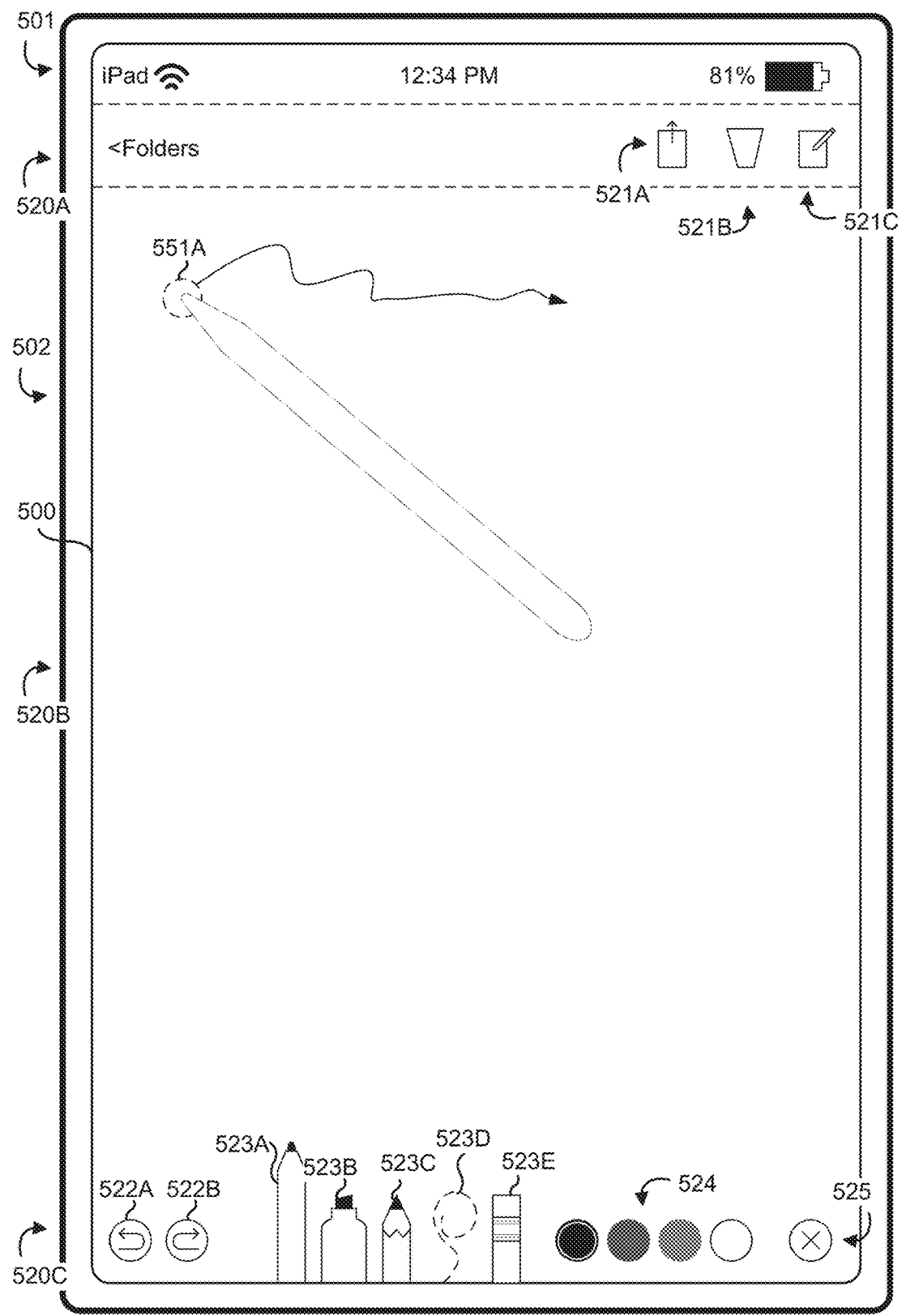
FIGS. 5A-5U illustrate example user interfaces for moving drawing objects in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
   Icon 416 for telephone module 138, labeled "Phone," which optionally includes an indicator 414 of the number of missed calls or voicemail messages;
   Icon 418 for e-mail client module 140, labeled "Mail," which optionally includes an indicator 410 of the number of unread e-mails;
   Icon 420 for browser module 147, labeled "Browser"; and
   Icon 422 for video and music player module 152, also referred to as iPod (trademark of Apple Inc.) module 152, labeled "iPod"; and
Icons for other applications, such as:
   Icon 424 for IM module 141, labeled "Text";
   Icon 426 for calendar module 148, labeled "Calendar";
   Icon 428 for image management module 144, labeled "Photos";
   Icon 430 for camera module 143, labeled "Camera";
   Icon 432 for online video module 155, labeled "Online Video";
   Icon 434 for stocks widget 149-2, labeled "Stocks";
   Icon 436 for map module 154, labeled "Map";
   Icon 438 for weather widget 149-1, labeled "Weather";
   Icon 440 for alarm clock widget 169-6, labeled "Clock";
   Icon 442 for workout support module 142, labeled "Workout Support";
   Icon 444 for notes module 153, labeled "Notes"; and
   Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
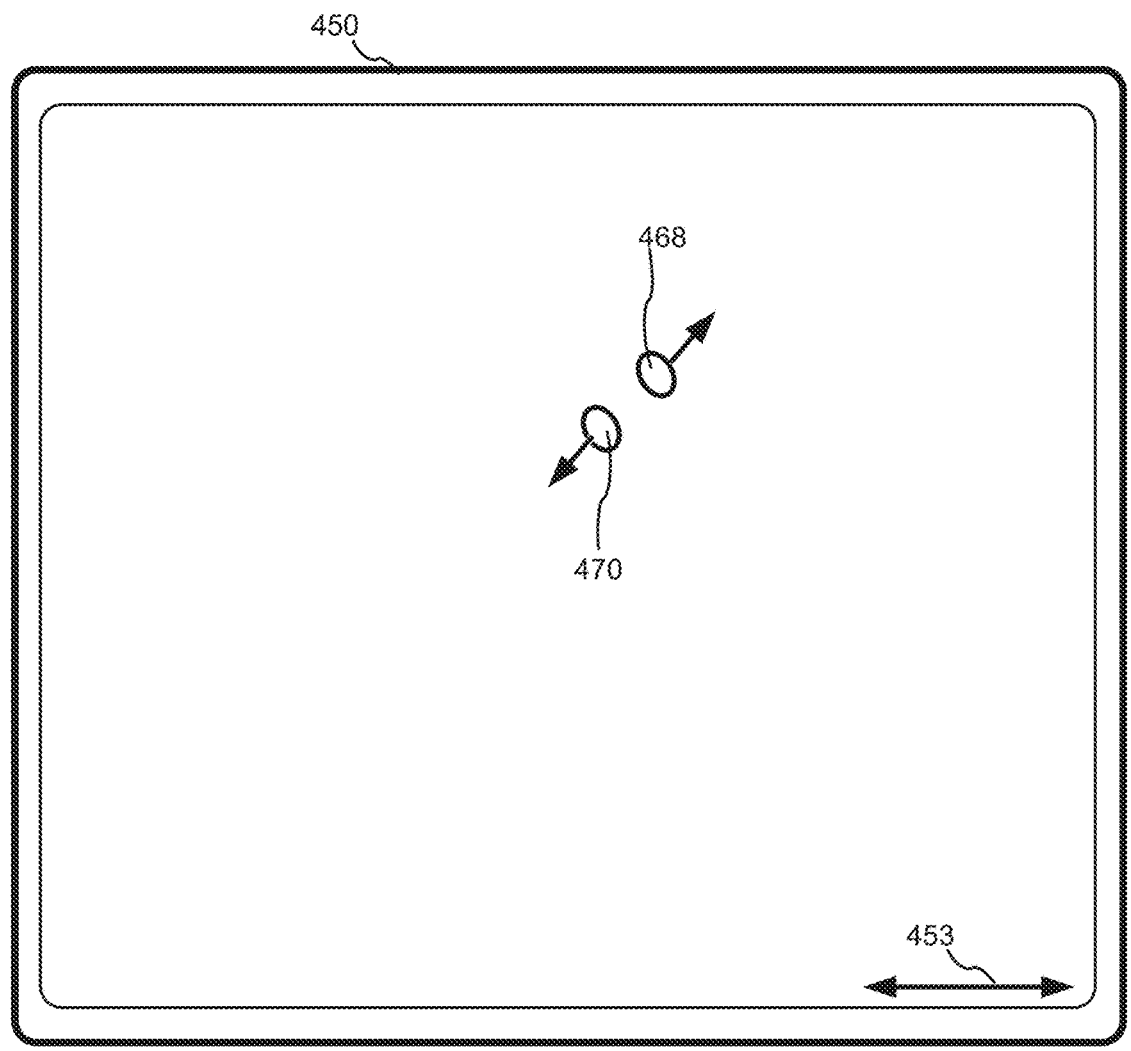
FIG. 4B illustrates an example user interface for a multifunction device with a touch-sensitive surface that is separate from the display in accordance with some embodiments.
Figure 4B:
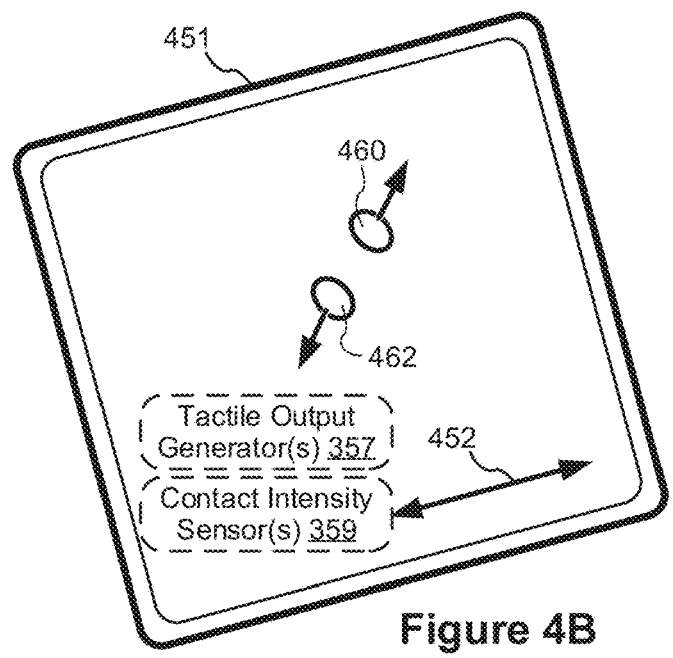

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

User Interfaces and Associated Processes

Attention is now directed towards embodiments of user interfaces ("UI") and associated processes that may be implemented on an electronic device, such as portable multifunction device (PMD) 100 or device 300, with a display, a touch-sensitive surface, and one or more sensors to detect intensity of contacts with the touch-sensitive surface.

FIGS. 5A-5U illustrate example user interfaces for moving drawings objects in accordance with some embodiments. The user interfaces in these figures are used to illustrate the processes described below, including the processes in FIGS. 6A-6E. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 5A illustrates a drawing user interface 502 as part of a user interface 500 displayed by a portable multifunctional device 100 (hereinafter "device 100"). The user interface 500 includes a device bar 501 at the top of the display including an identifier of the device 100 (e.g., "iPad"), a wireless connection indicator, a current time, and a battery indicator indicating a charge level of the device 100. The user interface 500 includes, below the device bar 501, and spanning the rest of the display, a drawing user interface 502.

The drawing user interface 502 includes an options bar 520A, a content region 520B, and a toolbar region 520C. The options bar 520A includes a share affordance 521A for sharing the content in the content region 520B with other users, e.g., emailing a copy of the content or sending a text message including a copy of the content. The options bar 520A includes a delete affordance 521B for deleting the content in the content region 520B. The options bar 520A includes a new-drawing affordance 521C for saving (and clearing) the content in the content region 520B.

The toolbar region 520C includes an undo affordance 522A that can be used to reverse the last action taken by the user (e.g., undo insertion of a drawing object) and a redo affordance 522B that can be used to retake an undone action (e.g., redo insertion of the drawing object). In various circumstances, the undo affordance 522A and/or the redo affordance 522B are not displayed or a grayed out if there is no action to undo or redo.

The toolbar region 520C includes a plurality of drawing tool selection affordances 523A-523E. The plurality of drawing tool selection affordances 523A-523E includes a pen tool selection affordance 523A associated with a pen tool that can be used to create opaque (or substantially opaque) drawing objects in the content region 520B, a highlighter tool selection affordance 523B associated with a highlighter tool that can be used to create thick-lined semi-transparent drawing objects in the content region 520B, a pencil tool selection affordance 523C associated with a pencil tool that can used to create thin-lined semi-transparent drawing objects in the content region 520B, a deletion tool selection affordance 523D associated with a deletion tool that can be used to delete drawing objects in the content region 520A, and a selection tool selection affordance 532D associated with a selection tool that can be used to select drawing objects in the content region 520B.

In FIG. 5A, the pen tool selection affordance 523A is displayed differently (e.g., raised) as compared to the other drawing tool selection affordances 523B-523E to indicate that the pen tool is selected.

The toolbar region 520C includes color selection affordances 524 for selecting a color of drawing objects inserted into the content creation region 520B. The toolbar region 520C includes a hide drawing tools affordance 525 that changes the toolbar region 520C from showing drawing tool selection affordance 523A-523E to showing options to select other types of content insertion affordances (e.g., for inserting text via a soft keyboard or for inserting a picture).

FIG. 5A illustrates movement of a stylus contact 551A detected within the content region 520B.

Figure 5B:
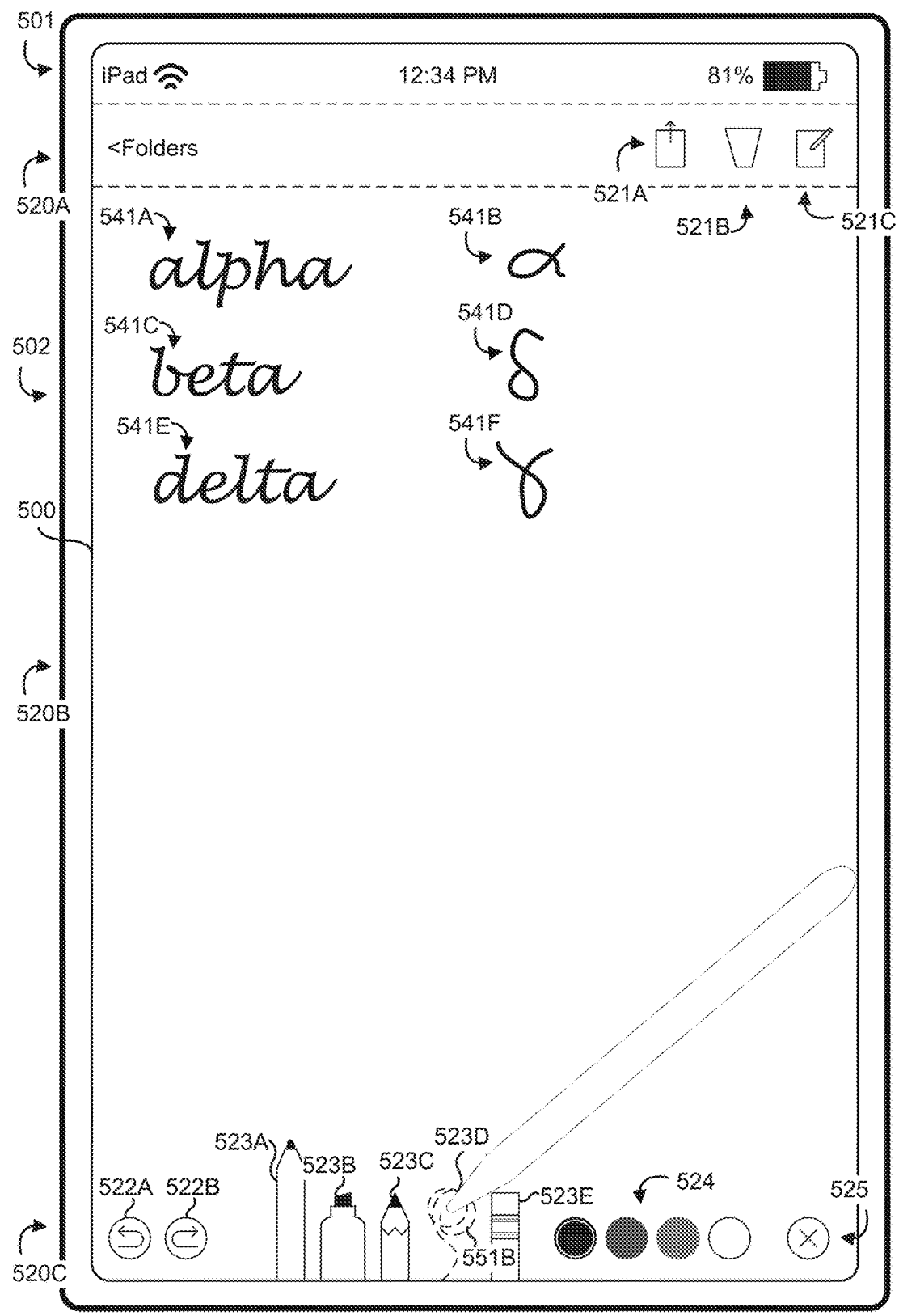

FIG. 5B illustrates the user interface 500 of FIG. 5A in response to detecting movement of the stylus contact 551A within the content region 520B. In response to detecting movement of the stylus contact 551A within the content region 520B, the user interface 500 includes, within the content region 520B, a plurality of drawing objects 541A-541F. The plurality of drawing objects 541A-541F include an alpha-word drawing object 541A, an alpha-letter drawing object 541B, a beta-word drawing object 541C, a delta-letter drawing object 541D, a delta-word drawing object 541E, and a gamma-letter drawing object 541F.

FIG. 5B illustrates a stylus contact 551B detected at the location of the selection tool selection affordance 523D.

Figure 5C:
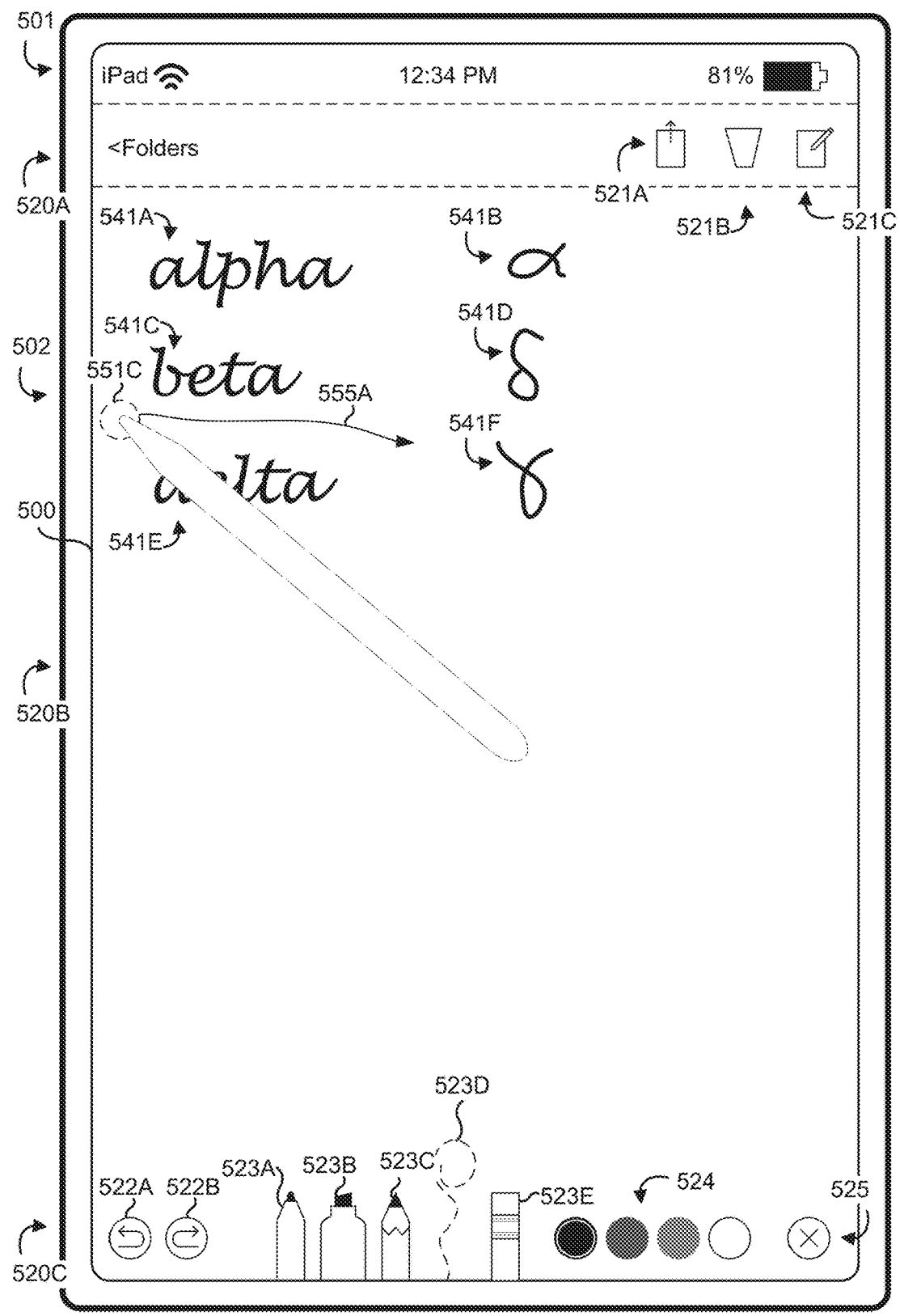

FIG. 5C illustrates the user interface 500 of FIG. 5B in response to detecting the stylus contact 551B at the location of the selection tool selection affordance 523D. In FIG. 5C, the selection tool selection affordance 523D is changed (e.g., raised) to indicate that the selection tool is selected. Conversely, the pen tool selection affordance 523A is changed (e.g., lowered) to indicated that the pen tool is no longer selected.

FIG. 5C illustrates movement of a stylus contact 551C along a path 555A detected within the content region 520B. The path 555A begins on one side of the content region 520A, passes between the beta-word drawing object 541C and the delta-word drawing object 541E, ending in the middle of the content region 520A between the delta-word drawing object 541E and the gamma-letter drawing object 541F.

Figure 5D:
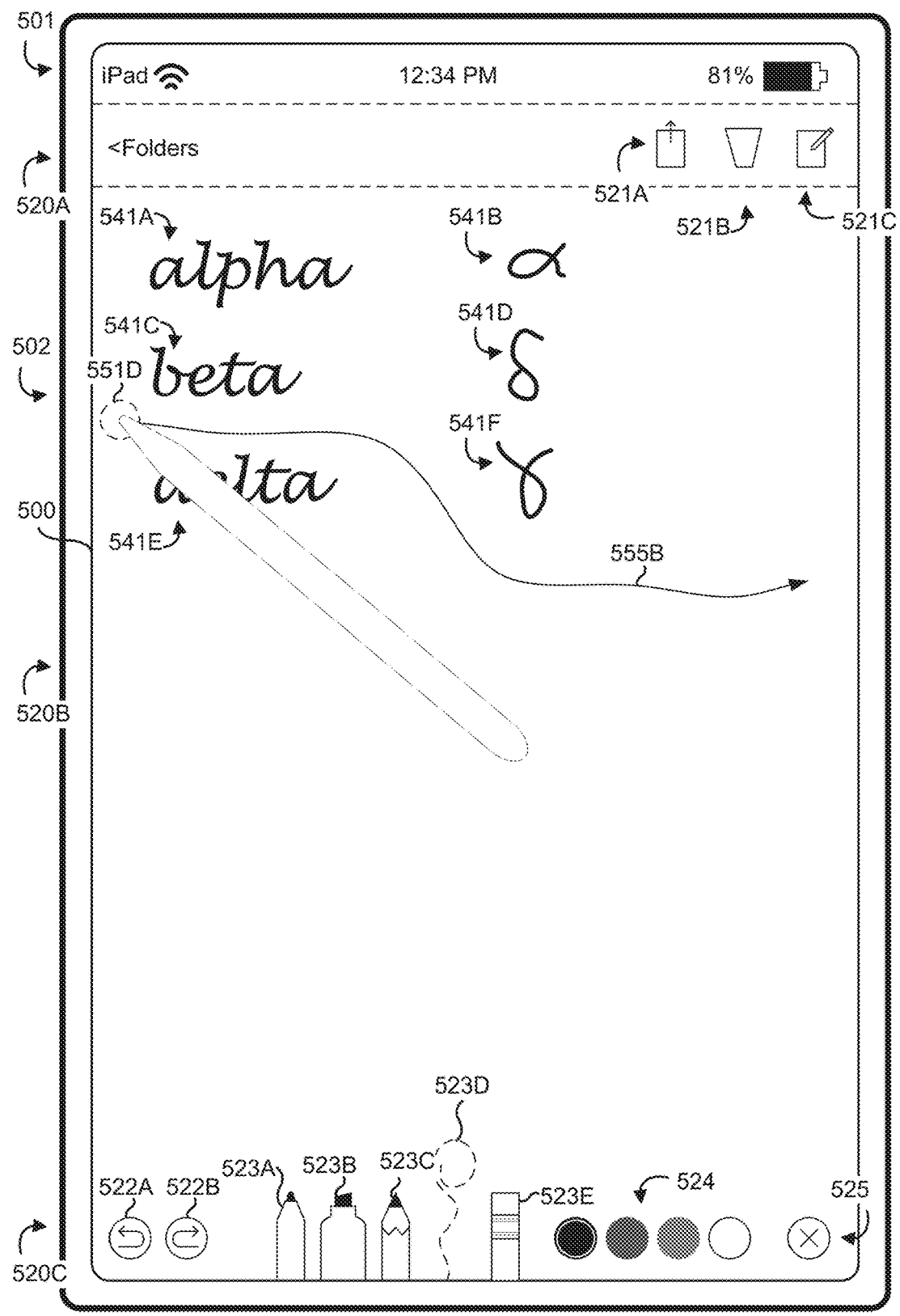

FIG. 5D illustrates the user interface 500 of FIG. 5C in response to detecting movement of the stylus contact 551C along the path 555A. In various implementations, a representation of the path 555A is displayed while the contact 551C is detected. However, in accordance with a determination that the path 555A fails to meet a length criterion and also fails to meet an object-enclosure criterion, the representation of the path ceases to be displayed when detection of the contact 551C ceases.

In some embodiments, the length criterion is satisfied if a path has an absolute length greater than a predetermined threshold. In some embodiments, the length criterion is satisfied if a path extends across more than a predetermined percentage of the drawing user interface 502 or the content region 520B thereof, e.g., 50%, 65%, 75%, 80%, 85%, 90%, or 95%. In some embodiments, the object-enclosure criterion is satisfied if a path encloses a drawing object. In various implementations, a path encloses a drawing object if a completed-path (including the path and a line connecting the start point and the end point of the path) defines a closed shape surrounding the drawing object or a portion thereof.

FIG. 5D illustrates movement of a stylus contact 551D along a path 555B detected within the content region 520B. The path 555B begins on one side of the content region 520A, passes between the beta-word drawing object 541C and the delta-word drawing object 541E, passes beneath the gamma-letter drawing object 541F, and ends at the other side of the content region 520A.

Figure 5E:
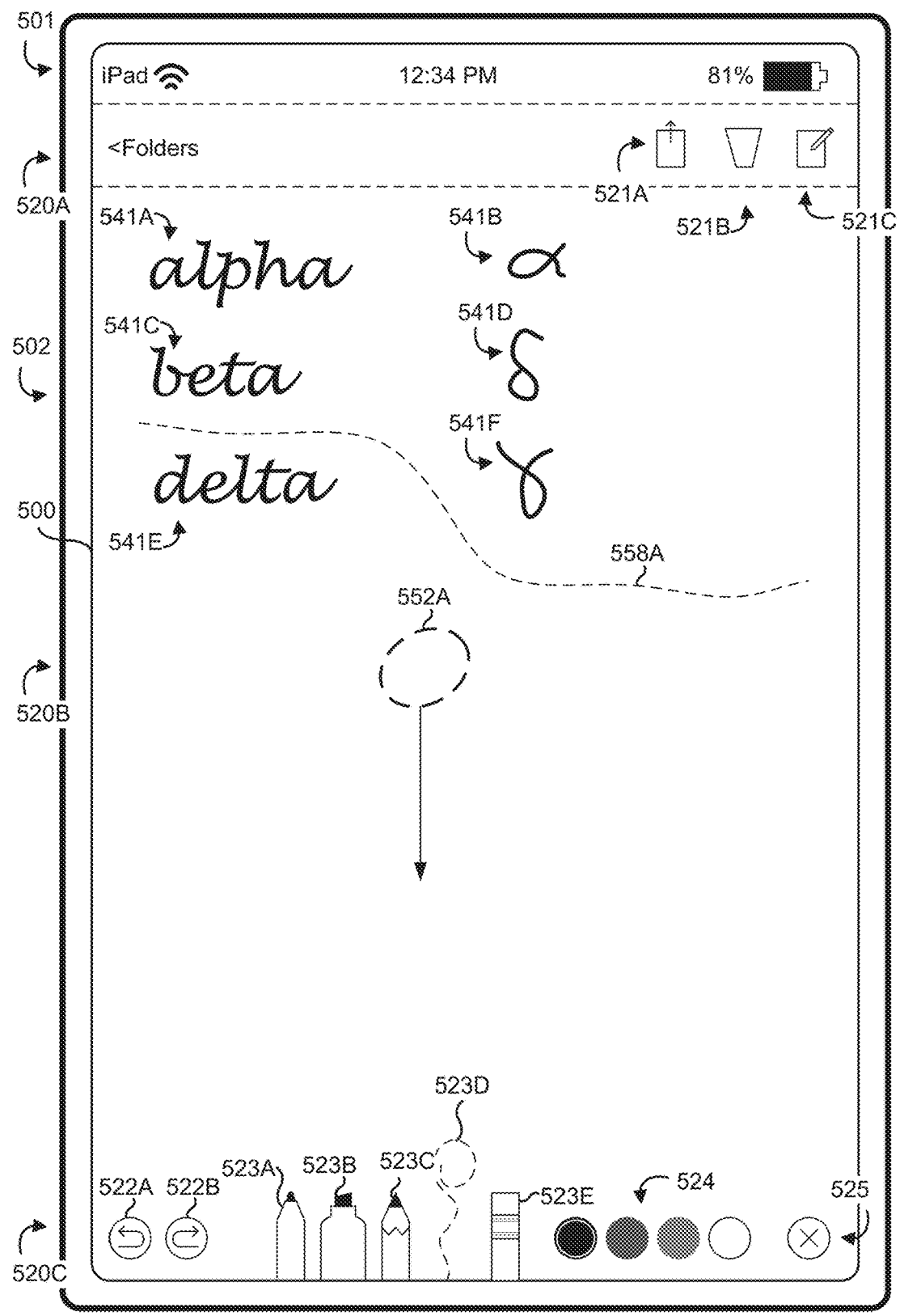

FIG. 5E illustrates the user interface 500 of FIG. 5D in response to detecting movement of the stylus contact 551D along the path 555B within the content region 520B. In accordance with the determination that the path 555B satisfies a length criterion, the user interface 500 includes a representation of the path 555B in the content region 520B in the form of a path graphic 558A.

In various implementations, the path graphic 558A includes partially transparent (e.g., 50% opacity) grey dashes. In such a way, the path graphic 558A can be seen over any color in underlying content. In various implementations, the path graphic 558A is animated, e.g., such that the dashes appear to move along the path.

FIG. 5E illustrates downward movement of a finger contact 552A detected within the content region 520B below the path graphic 558A.

Figure 5F:
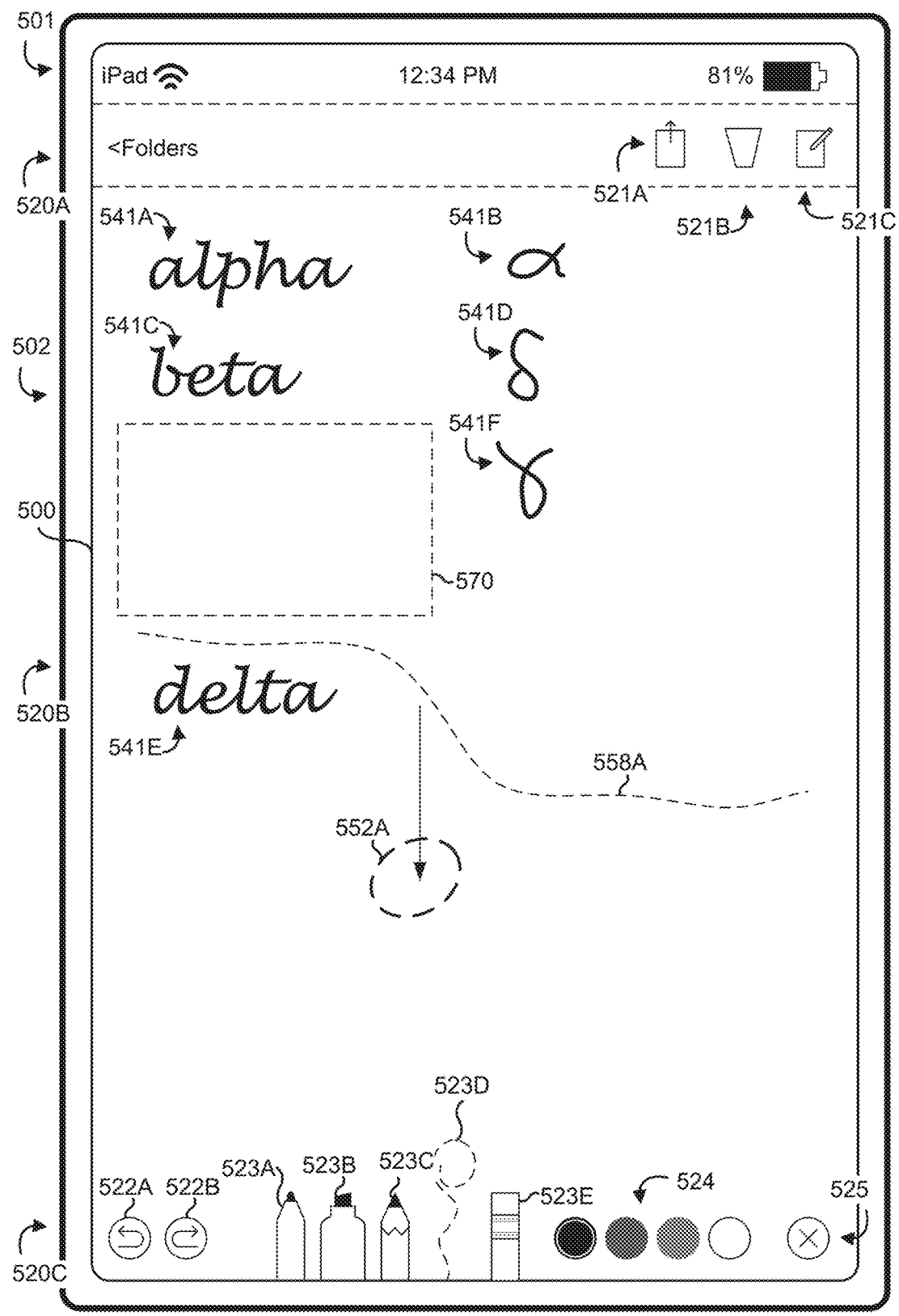

FIG. 5F illustrates the user interface 500 of FIG. 5E in response to detecting downward movement of the finger contact 552A within the content region 520B below the path graphic 558A. In FIG. 5F, the path graphic 558A and all drawing objects below the path graphic 558A (e.g., the delta-word drawing object 541E) are moved downward in accordance with the detected contact. In various implementations, the drawing objects below the path graphic 558A are moved a distance proportional (e.g., in a one-to-one proportion) to a distance of the movement of the finger contact 552A. In various implementations, the distance of the movement of the finger contact 552A is measured in only a single dimension (e.g., the vertical distance). Movement of the delta-word drawing object 541E increases the distance between the delta-word drawing object 541E and the beta-word drawing object 541C, creating a blank region 570 in the content region 520B of the drawing user interface 502. Although FIG. 5F illustrates a dashed box around the blank region 570 for illustrative purposes, it is to be appreciated that in various implementations, such a box is not displayed on the user interface 500.

Figure 5G:
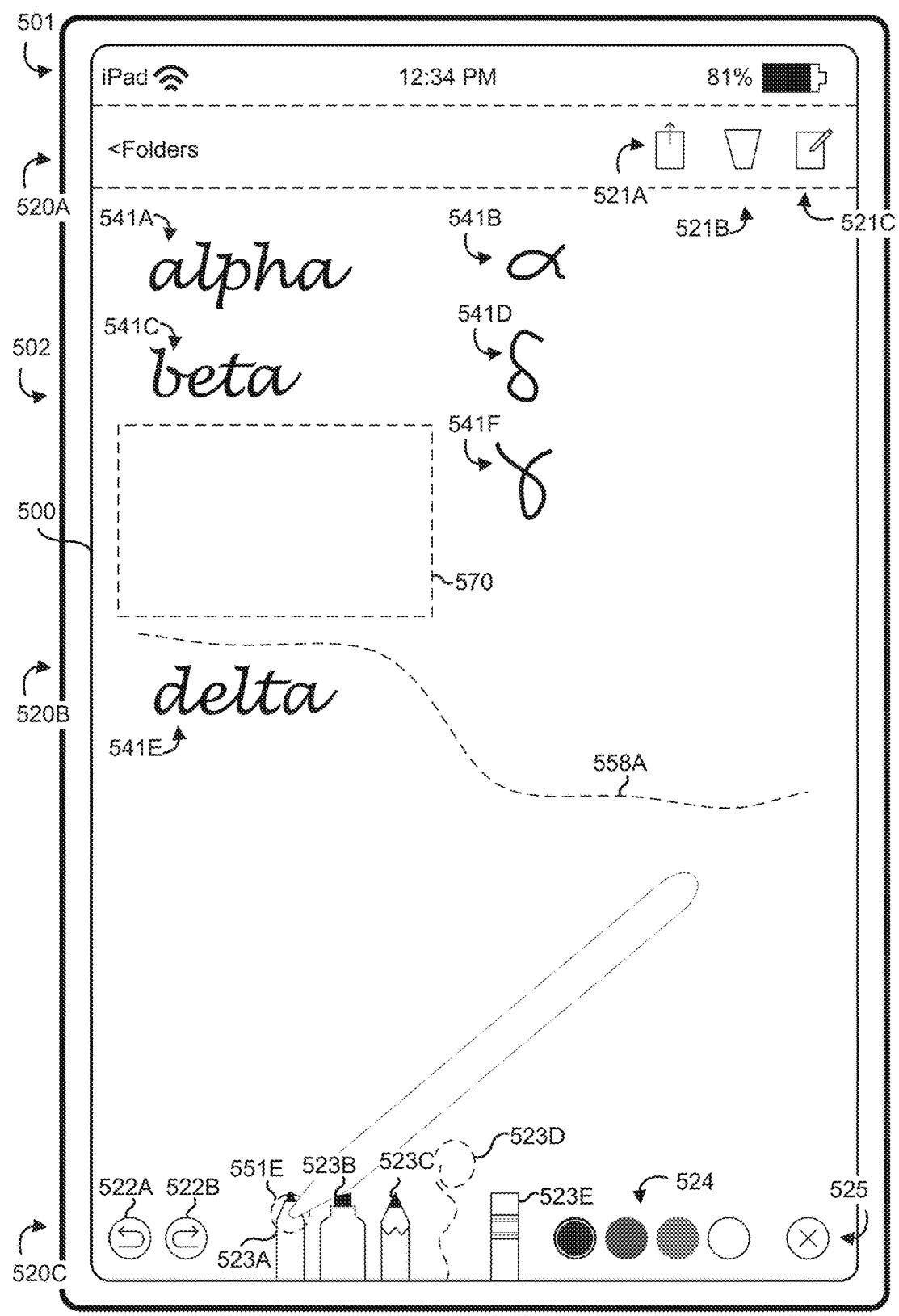

FIG. 5G illustrates the user interface 500 of FIG. 5F with a stylus contact 551E detected at the location of the pen tool selection affordance 523A.

Figure 5H:
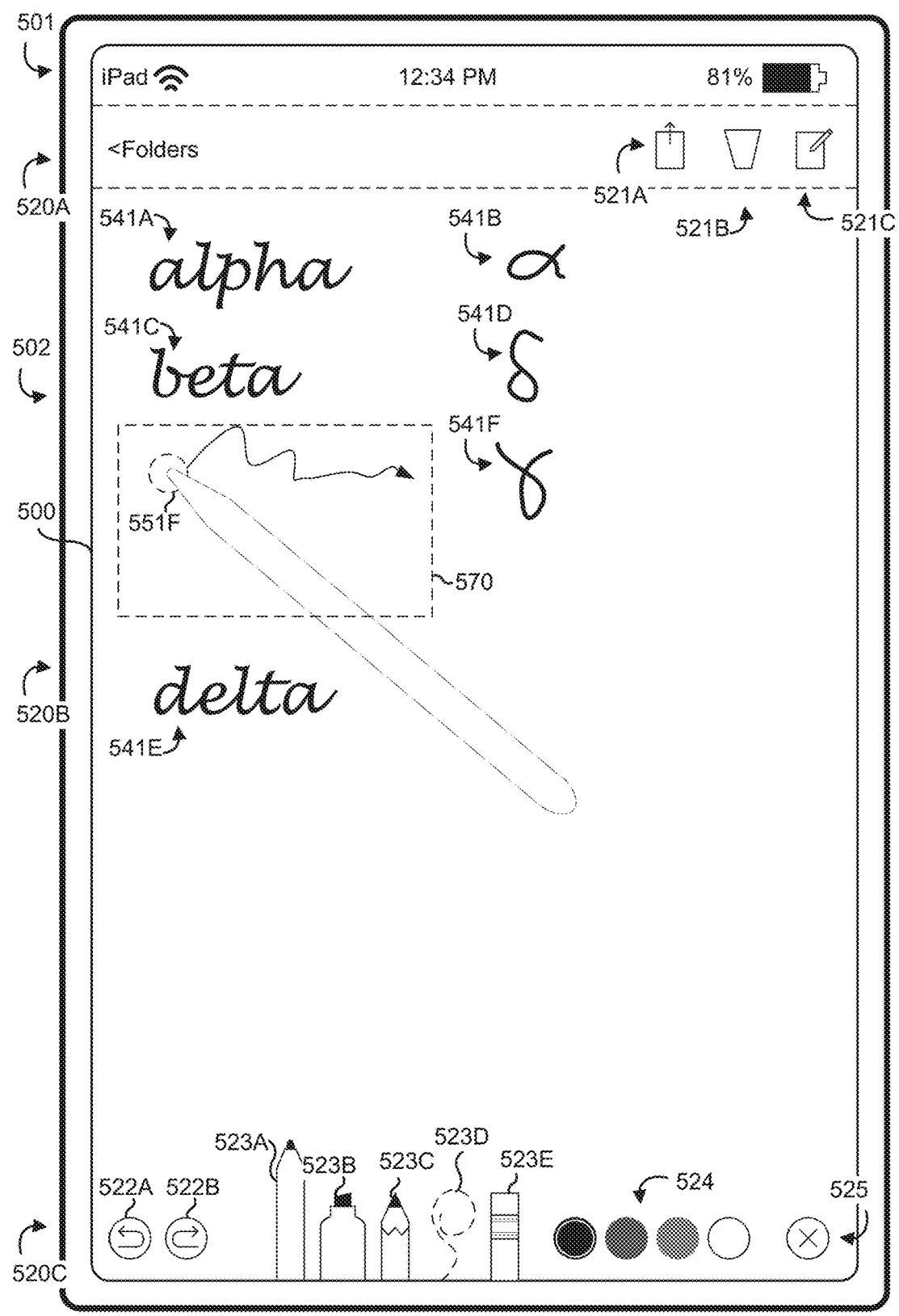

FIG. 5H illustrates the user interface 500 of FIG. 5G in response to detecting the stylus contact 551E at the location of the pen tool selection affordance 523A. In FIG. 5H, the pen tool selection affordance 523A is changed (e.g., raised) to indicate that the pen tool is selected. Conversely, the selection tool selection affordance 523D is changed (e.g., lowered) to indicated that the selection tool is no longer selected. Further, the path graphic 558A ceases to be displayed in response to the deselection of the selection tool.

FIG. 5H illustrates movement of a stylus contact 551F detected within the blank region 570 of the content region 520B.

Figure 5I:
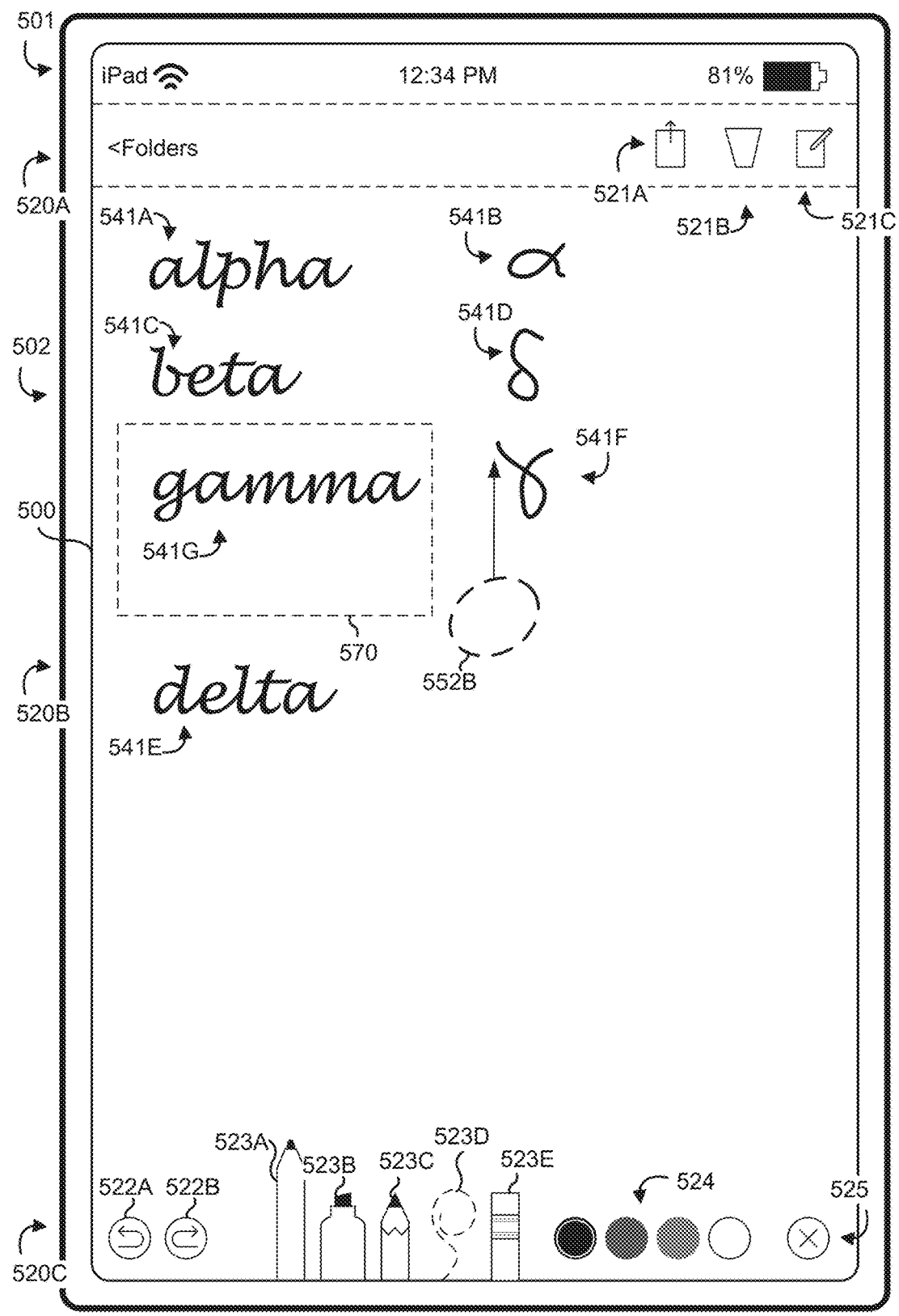

FIG. 5I illustrates the user interface 500 of FIG. 5H in response to detecting movement of the stylus contact 551F within the blank region 570 of the content region 520B. In response to detecting movement of the stylus contact 551A within the blank region 570 of the content region 520B, the user interface 500 includes, within the blank region 570 of the content region 520B, an additional drawing object, e.g., a gamma-word drawing object 541G.

FIG. 5I illustrates movement of a finger contact 552B detected within the content region 520B.

Figure 5J:
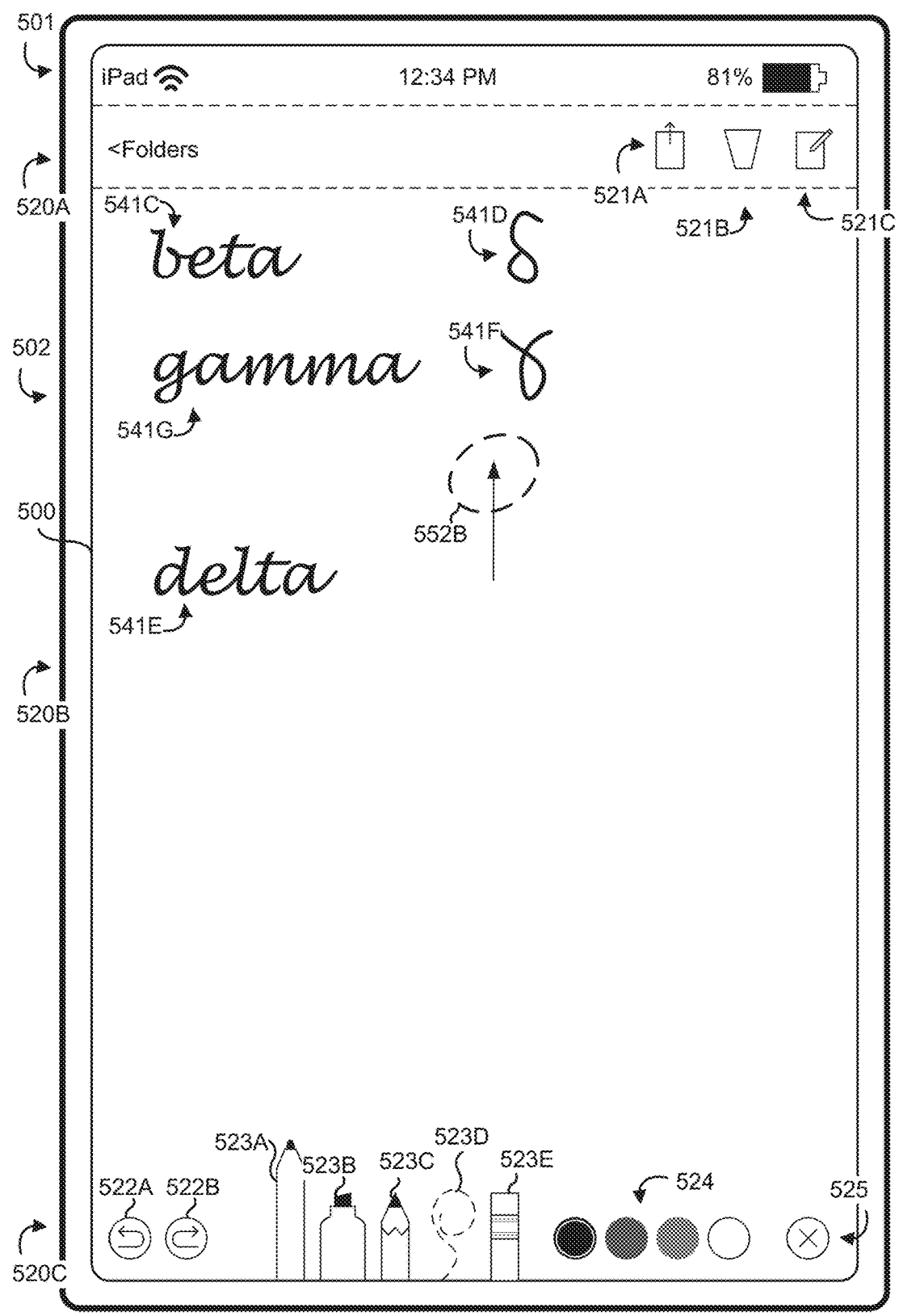

FIG. 5J illustrates the user interface 500 of FIG. 5I in response to detecting movement of the finger contact 552B within the content region. In FIG. 5J, the content region 520B is scrolled, moving the plurality of drawing objects 541A-541G equal amounts. Thus, while the pen tool is selected, in response to movement of a stylus contact within the content region 520A, a drawing object is inserted in the content region 520A, but in response to movement of a finger contact within the content region 520A, the content region 520A is scrolled.

Figure 5K:
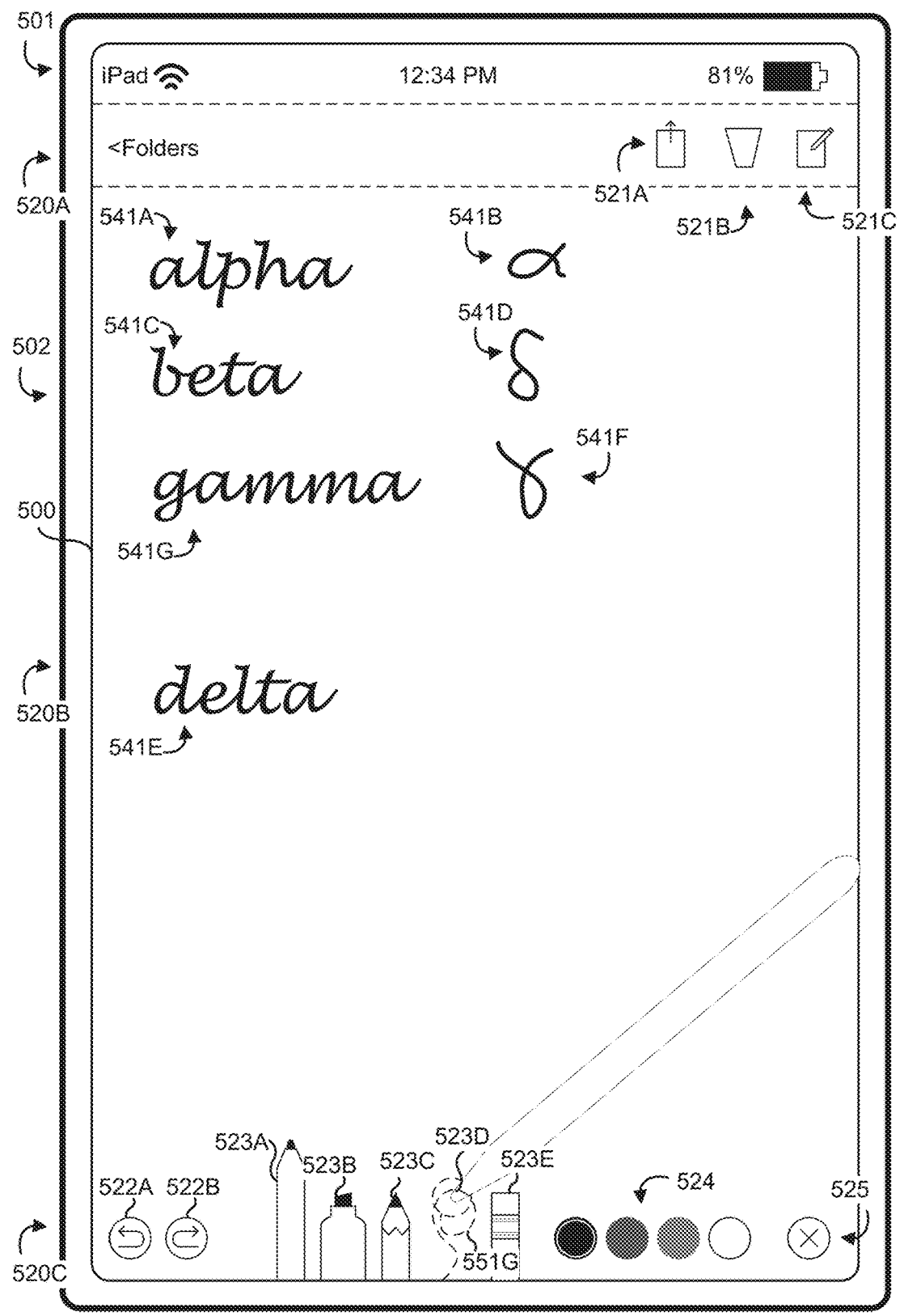

As compared to FIG. 5I, FIG. 5K illustrates the user interface 500 of FIG. 5H in response to detecting movement of the stylus contact 551F within the content region 520B. Whereas FIG. 5I illustrates movement of a finger contact 552B detected within the content region 520B, FIG. 5K illustrates a stylus contact 551G detected at the location of the selection tool selection affordance 523D.

Figure 5L:
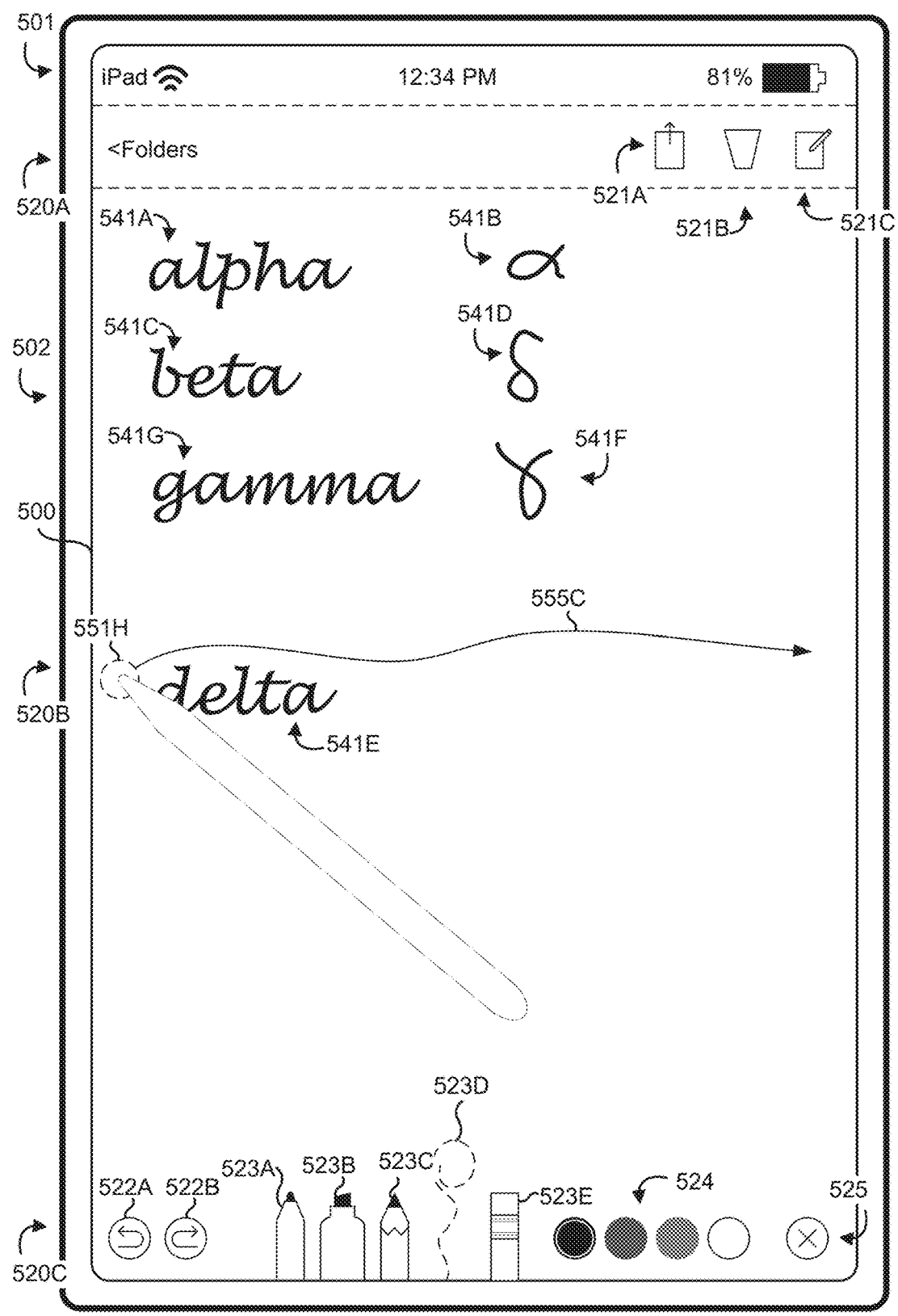

FIG. 5L illustrates the user interface 500 of FIG. 5K in response to detecting the stylus contact 551G at the location of the selection tool selection affordance 523D. In FIG. 5L, the selection tool selection affordance 523D is changed (e.g., raised) to indicate that the selection tool is selected. Conversely, the pen tool selection affordance 523A is changed (e.g., lowered) to indicated that the pen tool is no longer selected.

FIG. 5L illustrates movement of a stylus contact 551C along a path 555C detected within the content region 520B. The path 555C begins on one side of the content region 520A, passes between the gamma-word drawing object 541G and the delta-word drawing object 541E, passes below the gamma-letter drawing object 541F, and ends on the opposite side of the content region 520B.

Figure 5M:
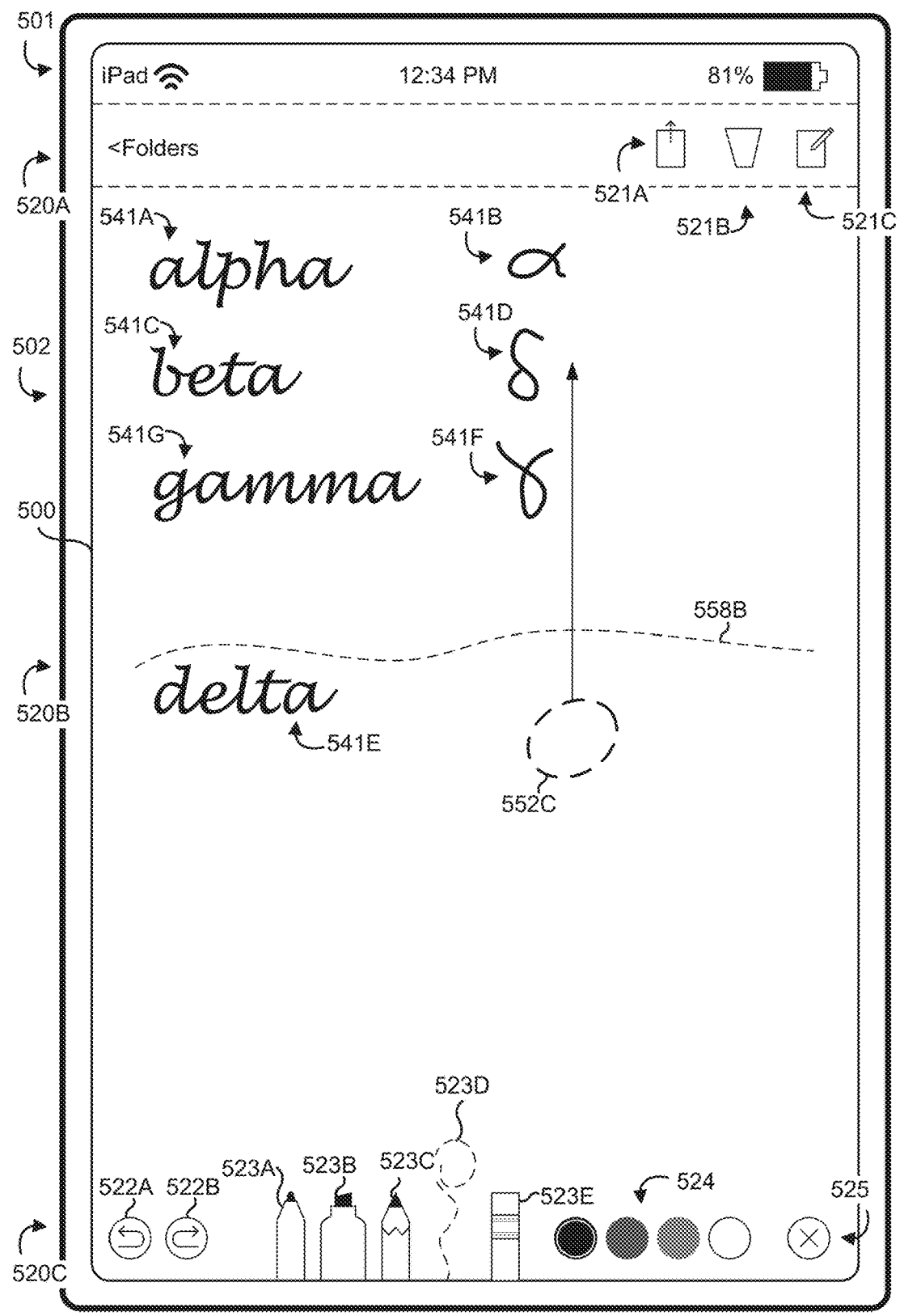

FIG. 5M illustrates the user interface 500 of FIG. 5L in response to detecting movement of the stylus contact 551C along the path 555C within the content region 520B. In accordance with the determination that the path 555C satisfies a length criterion, the user interface 500 includes a representation of the path 555C in the content region 520B in the form of a path graphic 558B.

FIG. 5M illustrates upward movement of a finger contact 552C detected within the content region 520B below the path graphic 558B.

Figure 5N:
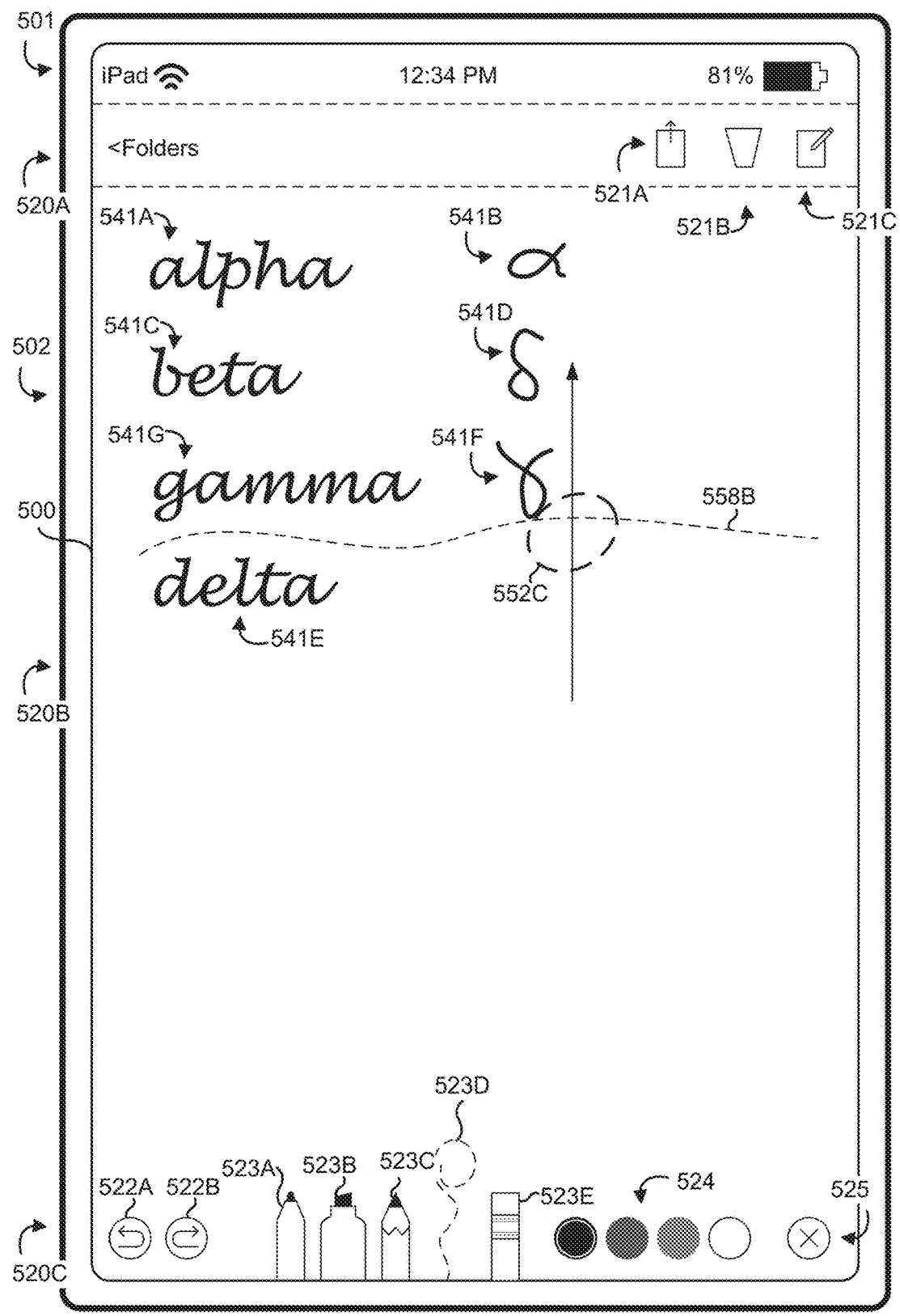

FIG. 5N illustrates the user interface 500 of FIG. 5M in response to detecting a first portion of the upward movement of the finger contact 552C within the content region 520B below the path graphic 558B. In FIG. 5N, the path graphic 558B and all drawing objects below the path graphic 558B (e.g., the delta-word drawing object 541E) are moved upwards in accordance with the first portion of the detected contact. In various implementations, the drawing objects below the path graphic 558B are moved a distance proportional (e.g., in a one-to-one proportion) to a distance of the movement of the finger contact 552C. In various implementations, the distance of the movement of the finger contact 552C is measured in only a single dimension (e.g., the vertical distance). The first portion of the upward movement of the finger contact 552C corresponds to distance until the path graphic 558B touches a drawing object (e.g., the gamma-letter drawing object 541F).

FIG. 5O1 illustrates a first embodiment of the user interface 500 of FIG. 5M in response to detecting a second portion of the upward movement of the finger contact 552C within the content region 520B below the path graphic 558B. In FIG. 5O1, in response to detecting the second portion of the upward movement (e.g., in accordance with a determination that the path graphic 558B touches a drawing object), the user interface 500 is unchanged. Accordingly, in response to detecting upward movement of the finger contact 552C, the drawing objects below the path graphic 558B are moved upwards until the path graphic 558B touches a drawing object and are, then, moved upward no further.

FIG. 5O2 illustrates a second embodiment of the user interface 500 of FIG. 5M in response to detecting a second portion of the upward movement of the finger contact 552C within the content region 520B below the path graphic 558B. In FIG. 5O2, in response to detecting the second portion of the upward movement (e.g., in accordance with a determination that the path graphic 558B touches a drawing object), the content region 520A is scrolled (e.g., the path graphic 558B and all the drawing objects are moved upwards equal amounts).

FIG. 5O3 illustrates a third embodiment of the user interface 500 of FIG. 5M in response to detecting a second portion of the upward movement of the finger contact 552C within the content region 520B below the path graphic 558B. In FIG. 5O3, in response to detecting the second portion of the upward movement, irrespective of a determination that the path graphic 558B touches a drawing object, the path graphic 558B and all the drawing objects below the path graphic 558B (e.g., the delta-word drawing object 541E) continue to move upwards in accordance with the second portion of the detected contact. Thus, in FIG. 5O3, the delta-word drawing object 541E overlaps with the gamma-word drawing object 541G.

Figure 5P:
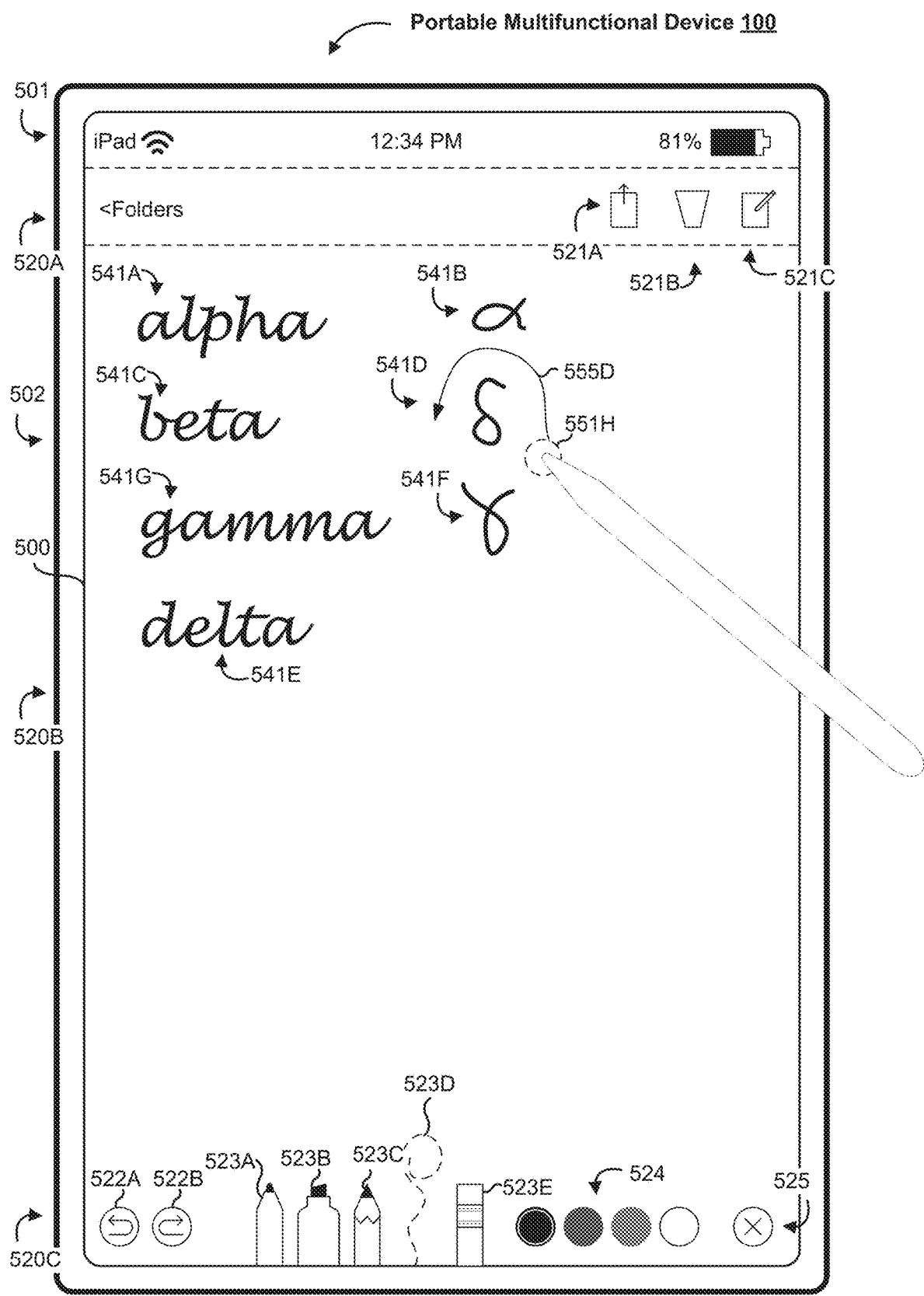

FIG. 5P illustrates the user interface 500 of FIG. 5O1 with movement of a stylus contact 551H along a path 555D detected within the contact region 520B.

Figure 5Q:
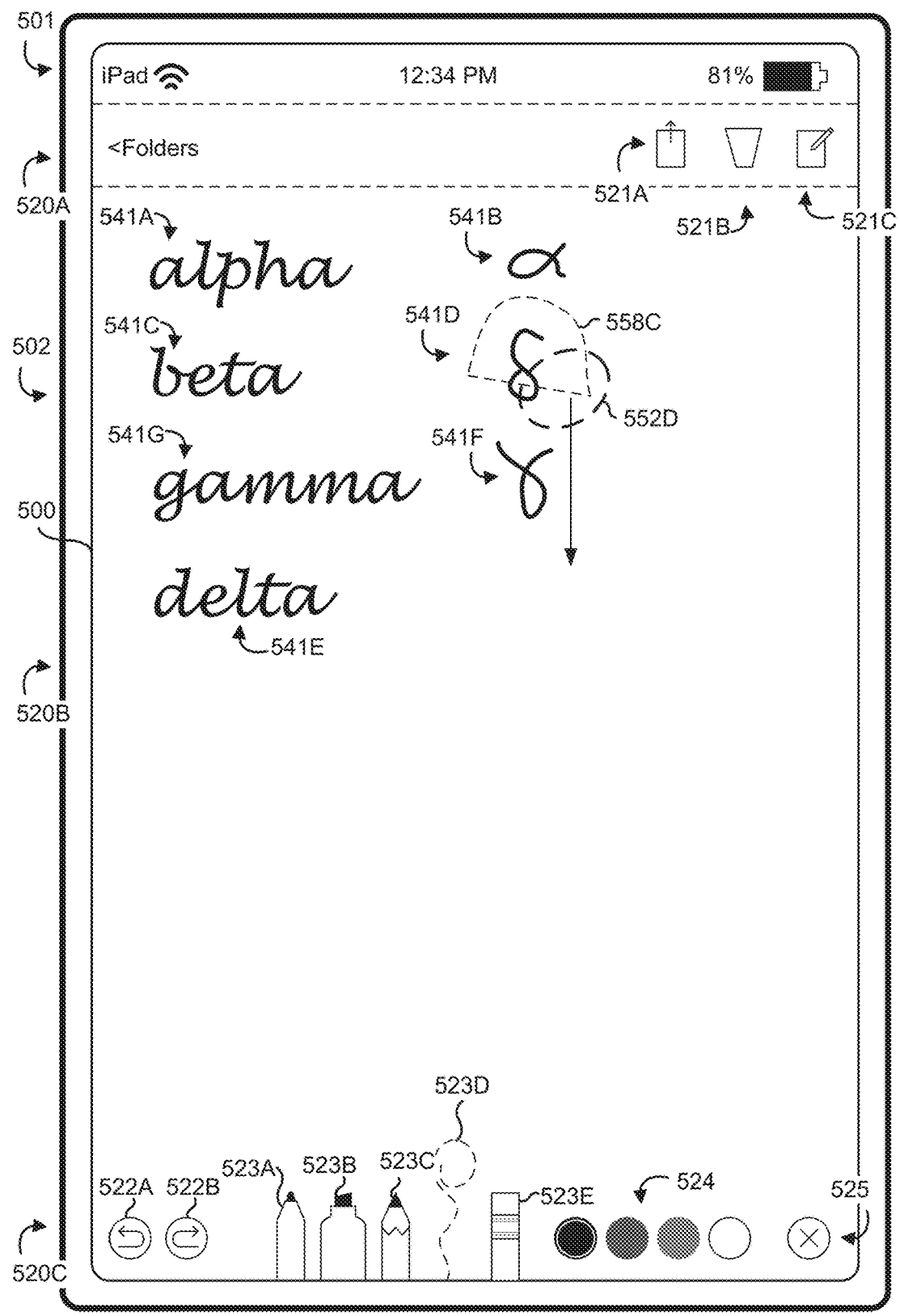

FIG. 5Q illustrates the user interface 500 of FIG. 5P in response to detecting movement of the stylus contact 551H along the path 555D within the contact region 520B. In accordance with a determination that the path 555D fail to meet the length criterion, but in accordance with a determination that the path 555D meets the object-enclosure criterion, the user interface 500 includes a representation of the path 555D in the content region 520B in the form of a path graphic 558C. The path 555D meets the object-enclosure criterion because the path 555D encloses the delta-letter drawing object 541D because a completed-path (including the path 555D and a line connecting the start point and the end point of the path 555D, as shown by the path graphic 558C) defines a closed shape surrounding a portion of the delta-letter drawing object 541D.

FIG. 5Q illustrates downward movement of a finger contact 552D detected at a start location of the path graphic 558C.

Figure 5R:
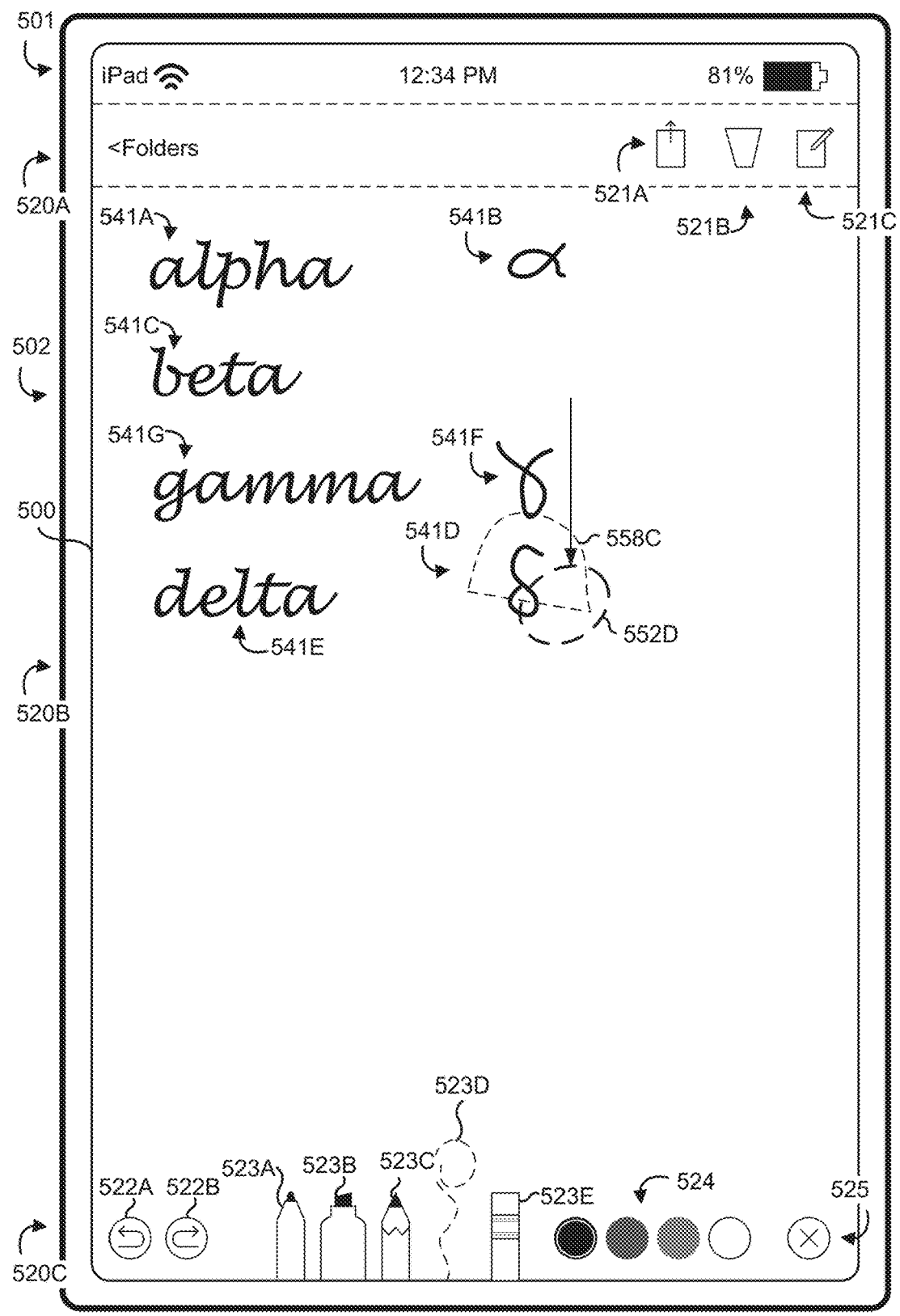

FIG. 5R illustrates the user interface 500 in response to detecting the downward movement of the finger contact 552D at the start location of the path graphic 558C. In FIG. 5R, the drawing objects selected by the path 558C (e.g., those drawing objects having at least a portion enclosed by the complete-path, in a particular, the delta-letter drawing object 541D) are moved downwards in accordance with movement of the finger contact 552D.

Figure 5S:
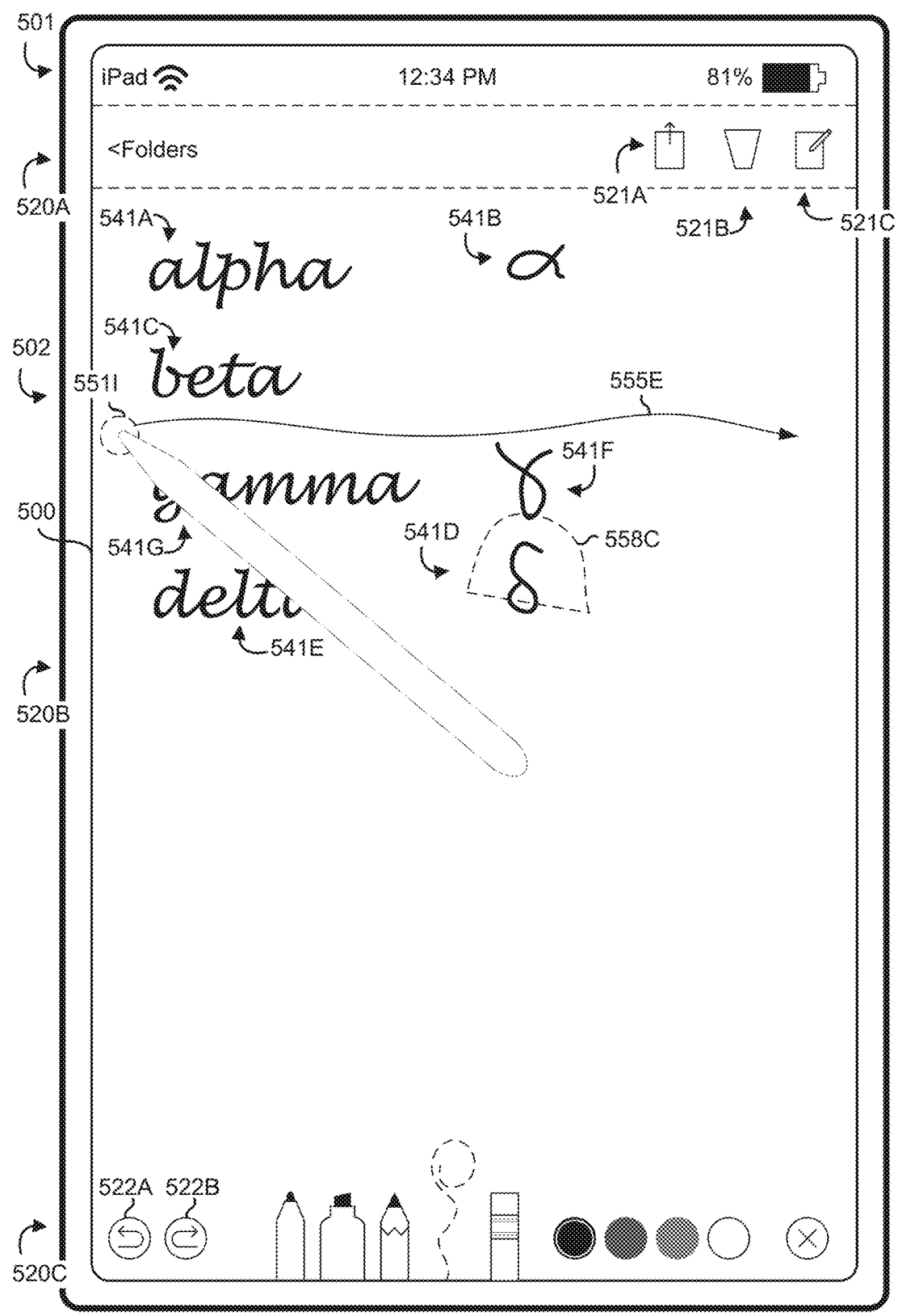

FIG. 5S illustrates the user interface 500 with movement of a stylus contact 551I detected along a path 555E within the content region 520A. In various implementations, a representation of the path 555E is displayed (replacing the path graphic 558C) while the contact 551I is detected.

Figure 5T:
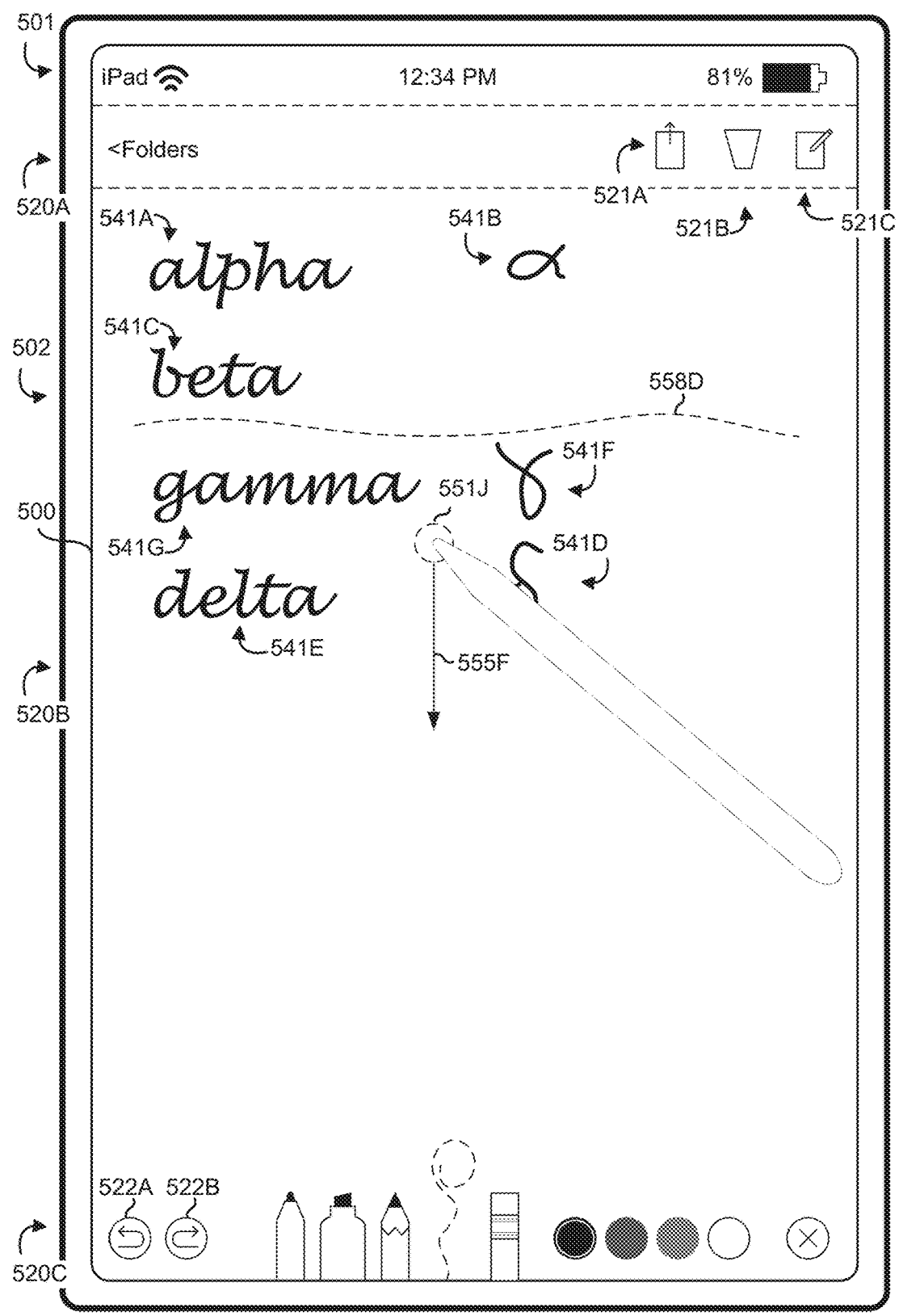
Figure 5U:
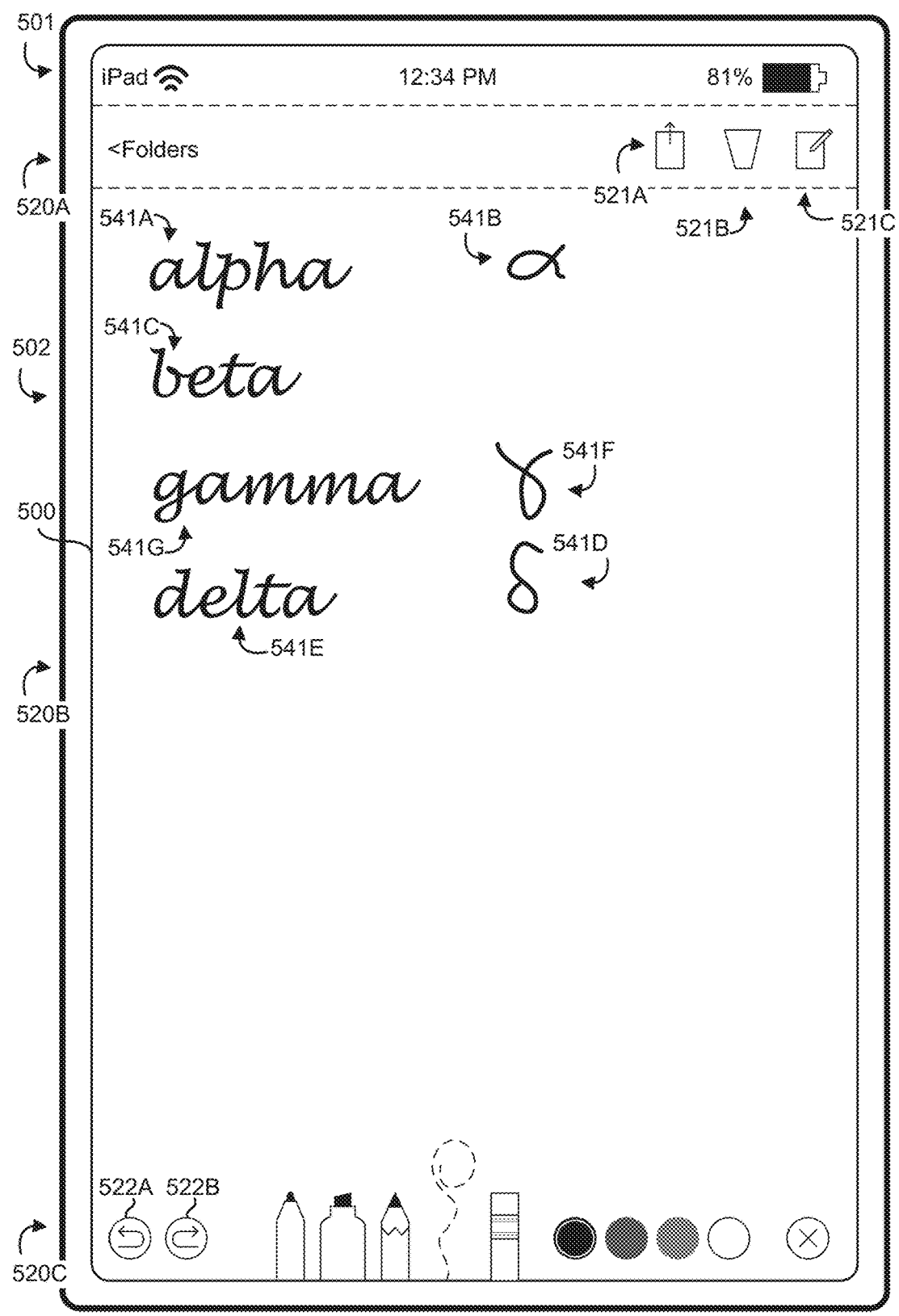

FIG. 5T illustrates the user interface 500 of FIG. 5S in response to detecting movement of the stylus contact 551I along the path 555E within the content region 520B. In accordance with the determination that the path 555E satisfies a length criterion, the user interface 500 includes a representation of the path 555E in the content region 520B in the form of a path graphic 558D.

FIG. 5T illustrates movement of a stylus contact 551J detected along a path within the content region 520A below the path graphic 558D. In various implementations, a representation of the path 555F is displayed (replacing the path graphic 558D) while the stylus contact 551J is detected.

FIG. 5U illustrates the user interface 500 of FIG. 5T in response to detecting the downward movement of the stylus contact 551J. In accordance with a determination that the path 555F fails to meet a length criterion and also fails to meet an object-enclosure criterion, a representation of the path displayed while the stylus contact 551J is detected ceases to be displayed when detection of the contact 551C ceases. Had the stylus contact 551J instead been a finger contact, downward movement of the contact would move the drawing objects below the path graphic 558D downward in accordance with the movement of the contact, as described above with respect to FIGS. 5E-5F.

Figure 6A:
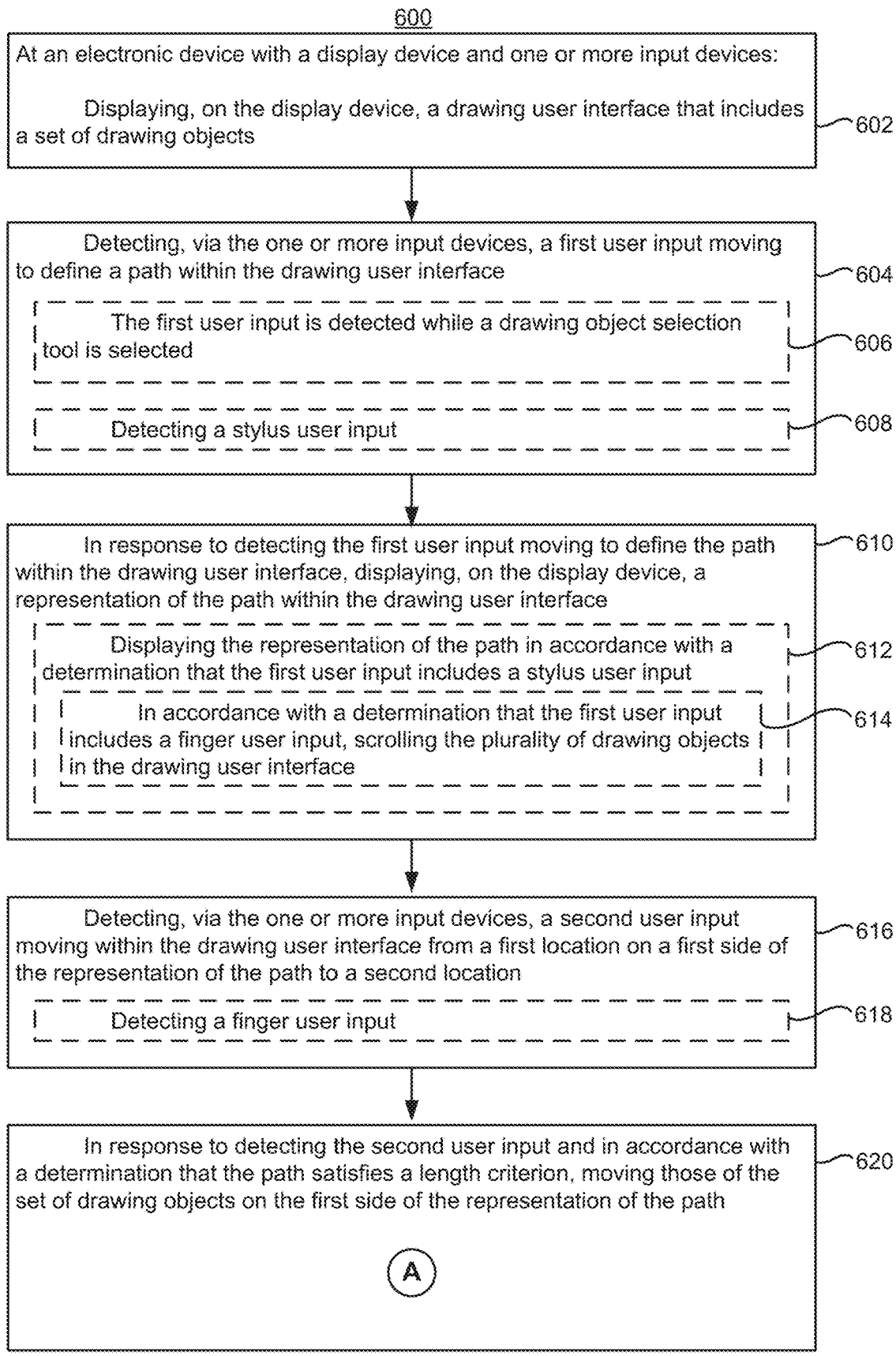

FIGS. 6A-6C illustrate a flow diagram of a method 600 of moving drawing objects in accordance with some embodiments. The method 600 is performed at an electronic device (e.g., the portable multifunction device 100 in FIG. 1A, or the device 300 in FIG. 3) with a display device and one or more input devices. In some embodiments, the display device is a touch-screen display and the one or more input devices are on or integrated with the display. In some embodiments, the display device is separate from the one or more input devices. Some operations in method 600 are, optionally, combined and/or the order of some operations is, optionally, changed.

As described below, the method 600 provides an intuitive way to move drawing objects. The method reduces the cognitive burden on a user when moving drawing objects, thereby creating a more efficient human-machine interface. For battery-operated electronic devices, enabling a user to moving drawing objects faster and more efficiently conserves power and increases the time between battery charges.

The device displays (602), on the display, a drawing user interface that includes a plurality of drawing objects. For example, in FIG. 5B, the device 100 displays the drawing user interface 502 that includes the plurality of drawing objects 541A-541F.

The device detects (604), via the one or more input devices, a first user input moving to define a path within the drawing user interface. For example, in FIG. 5D, the device 100 detects movement of the stylus contact 551D moving to define the path 555B within the content region 520B of the drawing user interface 502.

In some embodiments, the first user input is detected (606) while a drawing object selection tool is selected. For example, in FIG. 5D, the device 100 displays the selection tool selection affordance 523D differently than the other drawing tool selection affordances 523A-523C (e.g., raised) indicating that the selection tool is selected. For further example, in FIG. 5B, the device 100 detects the stylus contact 551B corresponding to a user input selecting the selection tool. By displaying a plurality of drawing tool selection affordances, the user interface provides an efficient mechanism for a user to select a drawing tool, thus reducing the amount of user interaction to perform various different predefined operations upon drawing objects. The reduction in user interaction reduces wear-and-tear of the device. The reduction in user interaction also results in faster initiation of the performance of the predefined operations and, thus, reduces power drain to perform the predefined operations, increasing battery life of the device.

In some embodiments, in detecting the first user input, the device detects (608) a stylus user input. For example, in FIG. 5D, the device 100 detect movement of the stylus contact 551D.

In response to detecting the first user input moving to define the path within the drawing user interface, the device displays (610), on the display device, a representation of the path within the drawing user interface. For example, in FIG. 5E, in response to detecting movement of the stylus contact 551B along the path 555B, the device 100 display the path graphic 558A within the content region 520B of the drawing user interface 502. Displaying the representation of the path provides feedback to the user, ensuring the path is that intended by the user, reducing the likelihood of further user interaction to provide a different path. Reducing the amount of user interaction with the device reduces wear-and-tear of the device and, for battery powered devices, increases battery life of the device.

In some embodiments, the device displays (612) the representation of the path in accordance with a determination that the first user input includes a stylus user input. For example, in FIG. 5E, in response to detecting movement of the stylus contact 551B, the device 100 displays the path graphic 558A. In contrast, in some embodiments, in accordance with a determination that the first user input includes a finger user input, the device scrolls (614) the plurality of drawing objects in the user interface. For example, in FIG. 5J, in response to detecting movement of the finger contact 552B, the device 100 scrolls the content region 520B of the drawing user input, moving the plurality of drawing objects 541A-541G. Although FIG. 5J illustrates the device 100 scrolling the plurality of drawing objects 541A-541G in response to detecting movement of a finger contact 552B while the pen tool is selected, in various implementations, the device 100 also scrolls the plurality of drawing objects 541A-541G in response to detecting movement of a finger contact while the selection tool is selected. Performing two different operations in response to the same gesture (movement of a contact) based on whether the gesture was performed with a stylus or a finger provides an efficient mechanism to perform either of the operations, thus reducing the amount of user interaction with the device to perform at least one of the operations. Reducing the amount of user interaction with the device reduces wear-and-tear of the device and, for battery powered devices, increases battery life of the device.

The device detects (616), via the one or more input devices, a second user input moving within the drawing user interface from a first location on a first side of the representation of the path to a second location. For example, in FIG. 5E, the device 100 detects movement of the finger contact 552A from a first location on a first side (e.g., below) the path graphic 558A to a second location (also on the first side). As another example, in FIG. 5M, the device 100 detects movement of the finger contact 552C from a first location on a first side of the path graphic 558B to a second location (on the second side).

In some embodiments, in detecting the first user input, the device detects (618) a finger user input. For example, in FIG. 5E, the device 100 detect movement of the finger 552A. As another example, in FIG. 5M, the device 100 detects movement of the finger contact 552C.

In response to detecting the second user input and in accordance with a determination that the path satisfies a length criterion, the device moves (620) those of the set of drawing objects on the first side of the representation of the path. For example, in FIG. 5F, in response to detecting movement of the finger contact 552A and in accordance that the path 555B corresponding to the path graphic 558A satisfies a length criteria, the device 100 moves those of the plurality of drawing objects 541A-541F on the first side of the path graphic 558A (e.g., the device 100 moves the delta-word drawing object 541E below the path graphic 558A). As another example, in FIG. 5N, in response to detecting movement of the finger contact 552C and in accordance that the path 555C corresponding to the path graphic 558B satisfies a length criteria, the device 100 moves those of the plurality of drawing objects 541A-541G on the first side of the path graphic 558B (e.g., the device 100 moves the delta-word drawing object 541E below the path graphic 558B). Moving those of the set of drawing objects on the first side of the representation of the path provides an efficient mechanism to create whitespace in the content region, thus reducing the amount of user interaction with the device. For example, a user need not individually select and move multiple objects and need not draw a large path surrounding all of the objects below the region whitespace is created. Reducing the amount of user interaction with the device reduces wear-and-tear of the device and, for battery powered devices, increases battery life of the device.

In some embodiments, the device moves (622) those of the set of drawing objects on the first side of the representation of the path in accordance with a determination that the second user input includes a finger user input. For example, in FIG. 5F, the device 100 moves those of the plurality of drawing objects 541A-541F on the first side of the path graphic 558A (e.g., the device 100 moves the delta-word drawing object 541E below the path graphic 558A) in accordance with a determination that the contact 552A is a finger contact. As another example, in FIG. 5N, the device 100 moves those of the plurality of drawing objects 541A-541G on the first side of the path graphic 558B (e.g., the device 100 moves the delta-word drawing object 541E below the path graphic 558B) in accordance with a determination that the contact 552C is a finger contact. In contrast, in some embodiments, in accordance with a determination that the second user input includes a stylus contact, the device 100 displays (624) a representation of a movement of the second user input. For example, in FIG. 5T, in accordance with a determination that the contact 551J is a stylus contact, the device 100 displays a representation of the path 555F (at least until the contact ceases at which point, in accordance with a determination that the path 555F does not meet a length criterion and does not meet an object-enclosure criterion, the device ceases to display the representation of the path). Performing two different operations in response to the same gesture (movement of a contact) based on whether the gesture was performed with a stylus or a finger provides an efficient mechanism to perform either of the operations, thus reducing the amount of user interaction with the device to perform at least one of the operations. Reducing the amount of user interaction with the device reduces wear-and-tear of the device and, for battery powered devices, increases battery life of the device.

In some embodiments, in response to detecting the user input and in accordance with a determination that the path does not satisfy the length criterion and does satisfy an object-enclosure criterion, the device moves (626) those of the set of drawing objects enclosed by the path. For example, in FIG. 5R, in response to detecting movement of the finger contact 552D and in accordance with a determination that the path the device 100 determines that the path 555D (as represented by the path graphic 558C) does not satisfy the length criterion and does satisfy an object-enclosure criterion, the device 100 moves those of the set of drawing objects enclosed by the path 555D (e.g., the device 100 moves the delta-letter drawing object 541D. Performing two different operations in response to same gesture (movement of stylus contact) based on whether the gesture satisfies different criteria provides an efficient mechanism to perform either of the operations, thus reducing the amount of user interaction with the device to perform at least one of the operations. Reducing the amount of user interaction with the device reduces wear-and-tear of the device and, for battery powered devices, increases battery life of the device.

In some embodiments, in accordance with a determination that the path does not satisfy the length criterion and does not satisfy an object-enclosure criterion, the device ceases (628) to display the representation of the path. For example, in FIG. 5C, in response to detecting movement of the stylus contact 551C, the device 100 displays a representation of the path 555A until the contact 551C ceases, at which point, in accordance with a determination that the path 555A does not satisfy the length criterion and does not satisfy the object-enclosure criterion, the device 100 ceases to display the representation of the path 555A. As another example, in FIG. 5T, in response to detecting movement of the stylus contact 551F, the device displays a representation of the path 555F until the contact 551C ceases, at which point, in accordance with a determination that the path 555F does not satisfy the length criterion and does not satisfy the object-enclosure criterion, the device 100 ceases to display the representation of the path 555F.

In some embodiments, the set of drawing objects includes (630) a first drawing object on the first side of the representation of the path and a second drawing object on the second side of the representation of the path. For example, in FIG. 5E, the plurality of drawings objects 541A-541F includes a first drawing object (e.g., the delta-word drawing object 541E) on the first side of the path graphic 558A and a second drawing object (e.g., the beta-word drawing object 541C) on the second side of the path graphic 558A. As another example, in FIG. 5M, the plurality of drawing objects 541A-541G includes a first drawing object (e.g., the delta-word drawing object 541E) on the first side of the path graphic 558B and a second drawing object (e.g., the beta-word drawing object 541C) on the second side of the path graphic 558B.

In some embodiments, in moving those of the plurality of objects on the first side of the representation of path, the device increases (632) the distance between the first drawing object and the second drawing object. For example, in FIG. 5F, the device 100 increases the distance between the delta-word drawing object 541E and the beta-word drawing object 541C. Increasing the distance between the first drawing object and the second drawing object provides an efficient mechanism for a user to insert whitespace into the content region, thus reducing the amount of user interaction with the device to perform at least one of the operations. Reducing the amount of user interaction with the device reduces wear-and-tear of the device and, for battery powered devices, increases battery life of the device.

In some embodiments, the device increases (634) the distance between the first drawing object and the second drawing object by an amount proportional to a distance of movement of the second user input. For example, in FIG. 5F, the device 100 increases the distance between the delta-word drawing object 541E and the beta-word drawing object 541C by an amount proportional to a distance of the movement of the finger contact 552A.

In some embodiments, increasing the distance between the first drawing object and the second drawing object creates (636) a blank region of the drawing user interface. For example, in FIG. 5F, increasing the distance between the delta-word drawing object 541E and the beta-word drawing object 541C creates the blank region 570 in the content region 520B of the drawing user interface 502.

In some embodiments, the device detects (638), via the one or more input devices, a drawing user input within the blank region. For example, in FIG. 5H, the device 100 detects movement of the stylus contact 551F in the blank region 570. In some embodiments, in response to detecting the drawing user input, the device displays (640), on the display device, a third drawing object in the blank region corresponding to the drawing user input. For example, in FIG. 5I, in response to detecting movement of the stylus contact 551F in the blank region 570, the device 100 displays the gamma-word drawing object 541G in the blank region 570.

In some embodiments, the device detects (642), via the one or more input devices, a scrolling user input within the drawing user interface. For example, in FIG. 5I, the device 100 detects movement of the finger contact 552B within the drawing user interface 502. In some embodiments, in response to detecting the scrolling user input, the device moves the first drawing object, the second drawing object, and the third drawing object. For example, in FIG. 5J, in response to detecting movement of the finger contact 552B, the device 100 moves the delta-word drawing object 541E, the beta-word drawing object 541C, and the gamma-word drawing object 541G.

In some embodiments, the device detects (646), via the one or more user input devices, a third user input moving to define a second path within the drawing user interface between the first drawing object and the second drawing object. For example, in FIG. 5L, the device 100 detects movement of the stylus contact 551H along a path 555C within the drawing user interface 502 between the delta-word drawing object 541E and the beta-word drawing object 541C. In some embodiments, in response to detecting the third user input, the device displays (648), on the display device, a representation of the second path within the drawing user interface. For example, in FIG. 5M, in response to detecting movement of the stylus contact 551H along the path 555C, the device 100 displays the path graphic 558B.

In some embodiments, the device detects (650), via the one or more input devices, a fourth user input moving within the drawing user interface from a first location on the first side of the representation of the second path to a second location. For example, in FIG. 5M, the device 100 detects movement of the finger contact 552C from a first location on the first side of the path graphic 558B (e.g., below the path graphic 558B) to a second location. In some embodiments, in response to detecting the fourth user input, the device decreases (652) the distance between the third drawing object and at least one of the first drawing object and the second drawing object. For example, in FIG. 5N, in response to detecting movement of the finger contact 552C, the device 100 decreases the distance between the gamma-word drawing object 541G and the delta-word drawing object 541G. In other circumstances, such as when the gamma-word drawing object 541G inserted closer to the delta-word drawing object 541E and the path 555C drawn above the gamma-word drawing object 541G, in response to detecting movement of the finger contact 552C, the device 100 decreases the distance between the gamma-word drawing object 541G and the beta-word drawing object 541C (e.g., by moving the gamma-word drawing object 541G upwards).

In some embodiments, moving those of the set of drawing objects on the first side of the representation of the path includes decreasing (654) the distance between the first drawing object and the second drawing object. For example, in FIG. 5N, the device 100 decreases the distance between the delta-word drawing object 541E and the beta-word drawing object 541C. Decreasing the distance between the first drawing object and the second drawing object provides an efficient mechanism for a user to remove whitespace from the content region. Thus, more content can be displayed on the screen and a smaller (and less expensive) screen can provide the same usability.

In some embodiments, in response to a first portion of the second user input, the device decreases (656) the distance between the first drawing object and the second drawing object by an amount proportional to a distance of the first portion of the second user input until the representation of the path touches one of the set of objects on the second side of the representation of the path. For example, in FIG. 5N, the device 100 decreases the distance between the delta-word drawing object 541E and the beta-word drawing object 541C by an amount proportional to movement of the finger contact 552C until the path graphic 558B touches the gamma-letter drawing object 541F.

In some embodiments, in response to a second portion of the second user input, the device maintains (658) the locations of the first drawing object and the second drawing object. For example, in FIG. 5O1, in response to detecting further movement of the finger contact 552C, the device 100 maintains the locations of the delta-word drawing object 541E and the beta-word drawing object 541C.

In some embodiments, in response to a second portion of the second user input, the device moves (660) the first drawing object and the second drawing object by an amount proportional to a distance of the second portion of the second user input. For example, in FIG. 5O2, in response to detecting further movement of the finger contact 552C, the device 100 moves the delta-word drawing object 541E and the beta-word drawing object 541C by an amount proportional to movement of the finger contact 552C. Thus, the device 100 scrolls the content region 520B in response to the second portion of the second user input.

In some embodiments, in response to a second portion of the second user input, the device moves (662) the first drawing object by an amount proportional to a distance of the second portion of the second user input and maintains the location of the second drawing object. For example, in FIG. 5O2, in response to detecting further movement of the finger contact 552C, the device 100 moves the delta-word drawing object 541E by an amount proportional to movement of the finger contact 552C, but maintains the location of the beta-word drawing object 541C.

In some embodiments, moving those of the set of drawing objects on the first side of the representation of the path includes moving those of the set of drawing object on the first side of the representation of the path along a predetermined axis. For example, in FIG. 5F, the delta-word drawing object 541E is moved only downward (even if the movement of the finger contact 552A includes a sideways component). As another example, in FIG. 5N, the delta-word drawing object 541E is moved only upward (even if the movement of the finger contact 552C includes a sideways component). Moving those of the set of drawing objects along a predetermined axis provides an efficient mechanism for a user to insert whitespace without altering other spatial relationships between drawing objects, reducing the amount of user interaction with the device. Reducing the amount of user interaction with the device reduces wear-and-tear of the device and, for battery powered devices, increases battery life of the device.

It should be understood that the particular order in which the operations in FIGS. 6A-6E have been described is merely example and is not intended to indicate that the described order is the only order in which the operations could be performed. One of ordinary skill in the art would recognize various ways to reorder the operations described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at a device with a display device and one or more input devices:
displaying, on the display device, a drawing user interface that includes a set of drawing objects including a first drawing object, a second drawing object, and a third drawing object;
detecting, via the one or more input devices, a first user input moving to define a path within the drawing user interface;
in response to detecting the first user input moving to define the path within the drawing user interface, displaying, on the display device, a representation of the path within the drawing user interface; and
after displaying the representation of the path within the drawing user interface:
detecting, via the one or more input devices, a second user input moving within the drawing user interface in a first direction; and
in response to detecting the second user input:
in accordance with a determination that the path satisfies a length criterion and that the first drawing object is on a first side of the path and the second drawing object and the third drawing object are on a second side of the path, moving the second drawing object and the third drawing object in the first direction based on the second user input without moving the first drawing object based on the second user input; and
in accordance with a determination that the path does not satisfy the length criterion and encloses the second user interface object without enclosing the first user interface object and without enclosing the third user interface object, moving the second drawing object in the first direction based on the second user input without moving the first drawing object based on the second user input and without moving the third drawing object based on the second user input.

2. The method of claim 1, wherein moving the second drawing object and the third drawing object in the first direction based on the second user input without moving the first drawing object based on the second user input includes increasing a distance between the first drawing object and the second drawing object.

3. The method of claim 2, wherein moving the second drawing object and the third drawing object in the first direction based on the second user input without moving the first drawing object based on the second user input includes increasing the distance between the first drawing object and the second drawing object by an amount proportional to a distance of movement of the second user input.

4. The method of claim 1, wherein moving the second drawing object and the third drawing object in the first direction based on the second user input without moving the first drawing object based on the second user input includes decreasing a distance between the first drawing object and the second drawing object.

5. The method of claim 4, wherein moving the second drawing object and the third drawing object in the first direction based on the second user input without moving the first drawing object based on the second user input includes, in response to a first portion of the second user input, decreasing the distance between the first drawing object and the second drawing object by an amount proportional to a distance of a first portion of the second user input until the representation of the path touches the second drawing object or the third drawing object.

6. The method of claim 4, wherein moving the second drawing object and the third drawing object in the first direction based on the second user input without moving the first drawing object based on the second user input includes, in response to a second portion of the second user input, maintaining the locations of the first drawing object and the second drawing object.

7. The method of claim 4, wherein moving the second drawing object and the third drawing object in the first direction based on the second user input without moving the first drawing object based on the second user input includes, in response to a second portion of the second user input, moving the first drawing object and the second drawing object by an amount proportional to a distance of the second portion of the second user input.

8. The method of claim 1, wherein the first user input is detected while a drawing object selection tool is selected.

9. The method of claim 1, comprising:
in accordance with a determination that the first user input includes a stylus user input, displaying the representation of the path within the drawing user interface; and
in accordance with a determination that the first user input includes a finger user input, scrolling the set of drawing objects in the drawing user interface.

10. The method of claim 1, comprising, in accordance with the determination that the path satisfies the length criterion and that the first drawing object is on the first side of the path and the second drawing object and the third drawing object are on the second side of the path:
in accordance with a determination that the second user input includes a finger user input, moving the second drawing object and the third drawing object in the first direction based on the second user input without moving the first drawing object based on the second user input and
in accordance with a determination that the second user input includes a stylus user input, displaying a representation of a movement of the second user input.

11. The method of claim 1, further comprising, in response to detecting the second user input:
in accordance with a determination that the path does not satisfy the length criterion and does not enclose any of the set of drawing objects, ceasing display of the representation of the path.

12. An electronic device comprising:
a display device configured to display a user interface;
one or more input devices configured to receive inputs; and
a processing device coupled with the display device and the one or more input devices, the processing device configured to:
display, on the display device, a drawing user interface that includes a set of drawing objects including a first drawing object, a second drawing object, and a third drawing object;
detect, via the one or more input devices, a first user input moving to define a path within the drawing user interface;
in response to detecting the first user input moving to define the path within the drawing user interface, display, on the display device, a representation of the path within the drawing user interface; and
after displaying the representation of the path within the drawing user interface:
detect, via the one or more input devices, a second user input moving within the drawing user interface in a first direction; and
in response to detecting the second user input:
in accordance with a determination that the path satisfies a length criterion and that the first drawing object is on a first side of the path and the second drawing object and the third drawing object are on a second side of the path, move the second drawing object and the third drawing object in the first direction based on the second user input without moving the first drawing object based on the second user input; and
in accordance with a determination that the path does not satisfy the length criterion and encloses the second user interface object without enclosing the first user interface object and without enclosing the third user interface object, move the second drawing object in the first direction based on the second user input without moving the first drawing object based on the second user input and without moving the third drawing object based on the second user input.

13. The electronic device of claim 12, wherein the processing device is configured to move the second drawing object and the third drawing object in the first direction based on the second user input without moving the first drawing object based on the second user input by increasing a distance between the first drawing object and the second drawing object.

14. The electronic device of claim 12, wherein the processing device is configured to move the second drawing object and the third drawing object in the first direction based on the second user input without moving the first drawing object based on the second user input by decreasing a distance between the first drawing object and the second drawing object.

15. The electronic device of claim 12, wherein the processing device detects the first user input while a drawing object selection tool is selected.

16. The electronic device of claim 12, wherein the processing device detects the first user input by detecting a stylus user input and detects the second user input by detecting a finger user input.

17. The electronic device of claim 12, wherein the processing device is further configured to:
in response to detecting the second user input and in accordance with a determination that the path does not satisfy the length criterion and does not enclose any of the set of drawing objects, ceasing display of the representation of the path.

18. A non-transitory computer readable storage medium storing one or more programs, the one or more programs comprising instructions, that, when executed by an electronic device with a display device and one or more input devices, cause the electronic device to:
   display, on the display device, a drawing user interface that includes a set of drawing objects including a first drawing object, a second drawing object, and a third drawing object;
   detect, via the one or more input devices, a first user input moving to define a path within the drawing user interface;
   in response to detecting the first user input moving to define the path within the drawing user interface, display, on the display device, a representation of the path within the drawing user interface; and
   after displaying the representation of the path within the drawing user interface:
      detect, via the one or more input devices, a second user input moving within the drawing user interface in a first direction; and
      in response to detecting the second user input:
         in accordance with a determination that the path satisfies a length criterion and that the first drawing object is on a first side of the path and the second drawing object and the third drawing object are on a second side of the path, move the second drawing object and the third drawing object in the first direction based on the second user input without moving the first drawing object based on the second user input; and
         in accordance with a determination that the path does not satisfy the length criterion and encloses the second user interface object without enclosing the first user interface object and without enclosing the third user interface object, move the second drawing object in the first direction based on the second user input without moving the first drawing object based on the second user input and without moving the third drawing object based on the second user input.

19. The non-transitory computer-readable medium of claim 18, wherein the instructions further cause the electronic device to:
   in response to detecting the second user input and in accordance with a determination that the path does not satisfy the length criterion and does not enclose any of the set of drawing objects, cease display of the representation of by the path.

* * * * *